(12) United States Patent
Suess et al.

(10) Patent No.: US 12,553,961 B2
(45) Date of Patent: Feb. 17, 2026

(54) STRAYFIELD INSENSITIVE MAGNETIC SENSING DEVICE AND METHOD USING SPIN ORBIT TORQUE EFFECT

(71) Applicant: Infineon Technologies AG, Neubiberg (DE)

(72) Inventors: Dieter Suess, Neudorf (AT); Udo Ausserlechner, Villach (AT); Armin Satz, Villach (AT); Klemens Pruegl, Regensburg (DE); Wolfgang Raberg, Sauerlach (DE); Milan Agrawal, Munich (DE); Johannes Guettinger, Lind ob Velden (AT); Michael Kirsch, Regensburg (DE)

(73) Assignee: Infineon Technologies AG, Neubiberg (DE)

( * ) Notice: Subject to any disclaimer, the term of this patent is extended or adjusted under 35 U.S.C. 154(b) by 349 days.

(21) Appl. No.: 17/461,117

(22) Filed: Aug. 30, 2021

(65) Prior Publication Data

US 2023/0066358 A1 Mar. 2, 2023

(51) Int. Cl.
*G01R 33/07* (2006.01)
(52) U.S. Cl.
CPC ......... *G01R 33/075* (2013.01); *G01R 33/072* (2013.01)
(58) Field of Classification Search
CPC .... G01R 33/075; G01R 33/09; G01R 33/091; G01R 33/093; G01R 33/095; G01R 33/096; G01R 33/098; G01R 33/0052; G01R 33/07; G01R 33/072; G01R 33/0206; H01N 52/00; H01N 52/01; H01N 52/101; H01N 52/80; H01N 52/85
See application file for complete search history.

(56) References Cited

U.S. PATENT DOCUMENTS

2018/0337326 A1* 11/2018 Sasaki ............... G11C 11/18
2021/0311139 A1* 10/2021 Suess ................ G01R 33/098

FOREIGN PATENT DOCUMENTS

CN 112082579 A * 12/2020 .............. G01D 5/16

OTHER PUBLICATIONS

Chen, J., Wurz, M. C., Belski, A. & Rissing, L. Designs and characterizations of soft magnetic flux guides in a 3-D magnetic field sensor. IEEE Trans. Magn. 48, 1481-1484 (2012).
Xu, Yanjun, et al. "Ultrathin All-in-One Spin Hall Magnetic Sensor with Built?In AC Excitation Enabled by Spin Current." Advanced Materials Technologies 3.8 (2018): 1800073.
Li, Ruofan, et al. "A spin-orbit torque device for sensing three-dimensional magnetic fields." Nature Electronics 4.3 (2021): 179-184.

* cited by examiner

*Primary Examiner* — David M Schindler
(74) *Attorney, Agent, or Firm* — Banner & Witcoff, Ltd.

(57) ABSTRACT

The described techniques facilitate the use of a magnetic field sensor that implements the same magnetic layer stack for the detection of the x, y, and z components of an external magnetic field. The sensor advantageously is insensitive to orthogonal stray fields and operates with a reduced offset compared to conventional magnetic field sensors. The linear regime implemented by the sensor to facilitate magnetic field detection may also be adjusted per application by tuning the current strength.

28 Claims, 22 Drawing Sheets

STRAYFIELD INSENSITIVE MAGNETIC SENSING DEVICE AND METHOD USING SPIN ORBIT TORQUE EFFECT

TECHNICAL FIELD

Aspects described herein generally relate to the use of a magnetic layer stack to detect external magnetic fields and, in particular, to the use of the spin-orbit torque (SOT) effect to adjust a magnetic field sensor's direction of sensitivity to magnetic fields in different directions.

BACKGROUND

Current magnetic field sensors include magnetoresistive (MR) sensors, which may operate to detect magnetic fields in three axes. However, conventional MR sensors that allow for 3D magnetic field detection use flux gates to detect fields in each direction. However, the use of magnetic flux gates leads to a non-orthogonality of the three sensing directions. Other MR proposed sensors that are manufactured to minimize offset between the orthogonality of sensing directions include Anisotropic Magneto-Resistive (AMR) sensors or anomalous Hall Effect sensors, which require a domain "wall" in the free layer. The domain wall, however, leads to noise and non-reproducible behaviors. Moreover, large external fields may annihilate the domain wall, resulting in an alteration of the sensor response or even destruction of its functional behavior.

Other types of 3D magnetic field sensors, which may rely on the spin-orbit torque (SOT) effect, do not use all three axes of the SOT effect, and thus only function to reduce offset in two directions. As a result, current 3D magnetic sensors are inadequate.

BRIEF DESCRIPTION OF THE DRAWINGS/FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects.

The example aspects of the present disclosure will be described with reference to the accompanying drawings. The drawing in which an element first appears is typically indicated by the leftmost digit(s) in the corresponding reference number.

SUMMARY

Again, current 3D magnetic field sensors may implement the SOT effect, but fail to perform magnetic field measurements in three different axes. In the embodiments as discussed in further detail herein, the SOT effect is used to detect up to three magnetic field components, which results in a very small offset in all directions. Furthermore, the embodiments described herein may implement a single domain portion, which leads to more reliable functional behavior, as the domain wall does not have to be generated before use. The embodiments described herein also operate with an in-plane ferromagnetic layer and thus enable the detection of out-of-plane fields, a capability that xMR sensors (i.e. giant magnetoresistance (GMR) and tunnel magnetoresistance (TMR) sensors) fail to possess. In other embodiments, the magnetization direction is switched in substantially opposing directions as a function of applied SOT current, and may use TMR or GMR elements.

The embodiments as discussed operate by recognizing that an interesting effect occurs if the SOT effect is combined with an xMR (i.e. GMR and TMR) sensor architecture. However the discussed embodiments are not restricted to an xMR sensor principle, and may also be used by applying the anomalous Hall effect, the anisotropic magnetoresistance (AMR) effect, etc. Specifically, it has been observed that a critical current strength exists (i.e. a predetermined threshold current value), above which the sensor's sensitive axis changes from one axis (e.g. the x- or y-axis) to another axis (e.g. the z-axis). This effect is used in accordance with the embodiments herein to design a 3D magnetic field sensor. The embodiments described herein have advantages related to offset reduction, insensitivity to orthogonal stray fields, a linear range that may be tuned as a function of current strength, a sensitivity direction that may be tuned as a function of current strength, an in-plane ferromagnetic layer that may be used to detect out-of-plane fields, and the use of a single magnetic layer stack to detect x-, y-, and z-magnetic field components.

DETAILED DESCRIPTION

In the following description, numerous specific details are set forth to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

Figure 1:
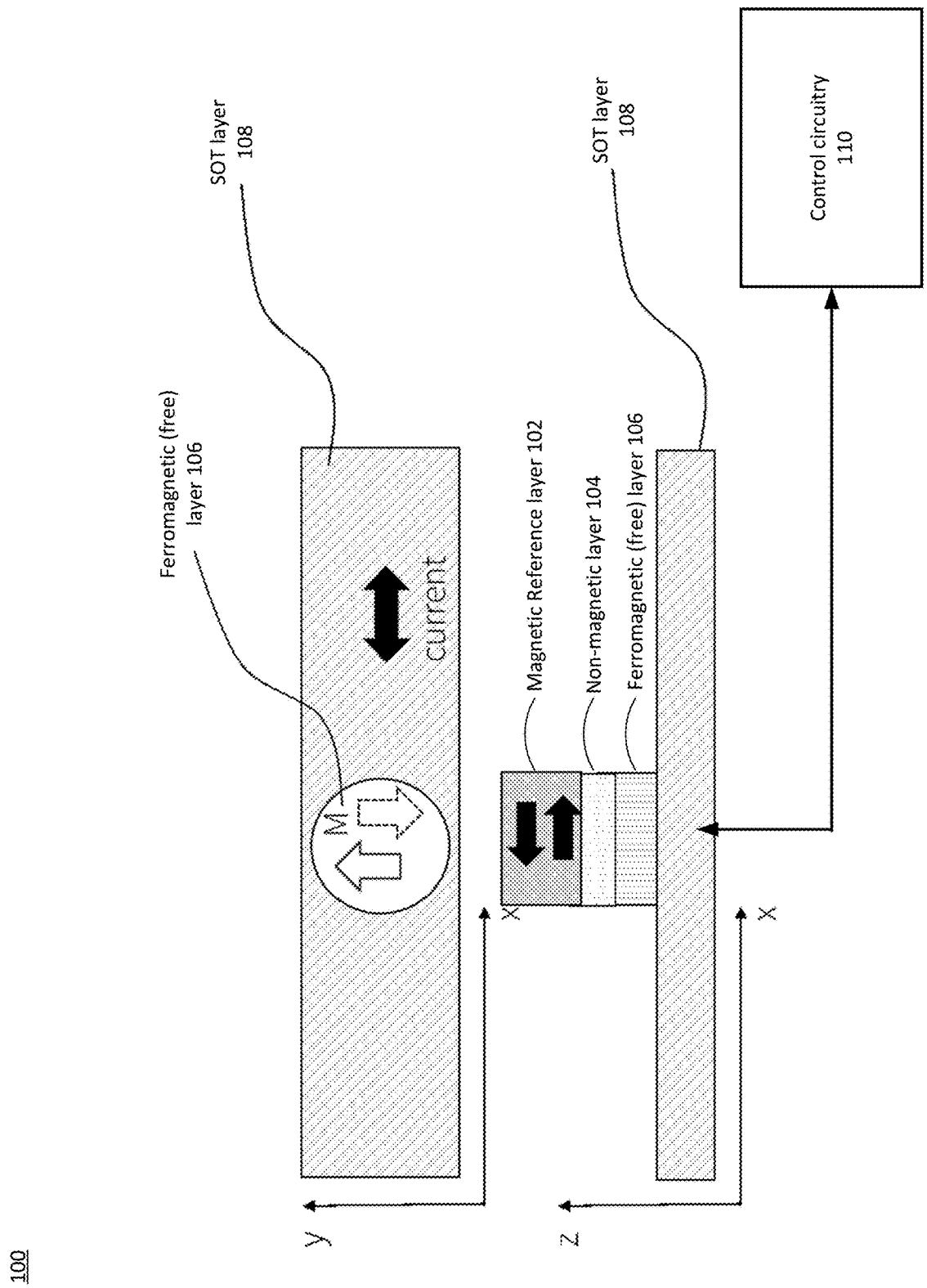
FIG. 1 illustrates an example sensor configuration with an in-plane reference system, in accordance with one or more embodiments of the disclosure.

FIG. 1 illustrates an example sensor configuration with an in-plane reference system, in accordance with one or more embodiments of the disclosure. The sensor 100 as shown in FIG. 1 includes a layer stack and control circuitry that is coupled to one or more layers of the layer stack to generate SOT currents and measure one or more components of a magnetic field acting externally to the sensor 100, the details of which are further discussed below.

The layer stack portion of the sensor 100 is shown and discussed herein with reference to a specific number and type of layers. However, this is by way of example and not limitation, and the layer stack as shown in FIG. 1, as well as additional configurations as discussed herein, may include alternate, additional, or fewer layers. The layers of the layer stack as discussed herein may be coupled to one another and comprise any suitable type of material to facilitate their respective functions, which may be implemented with known materials. Each of the layers of the layer stack may constitute a film or other suitably thin layer, with each layer defining its own respective plane. Each of the layers may be parallel to one another, and thus each respective plane occupied by each of the layers of the layer stack may likewise be parallel with one another.

The layer stack of the sensor 100 includes a magnetic reference layer 102, which has a fixed magnetization direction and establishes a fixed frame of reference for performing the magnetic field measurements. The sensor 100 further includes a ferromagnetic layer 106, or free layer, which is referred herein as having a variable magnetization direction. The variable magnetization direction of the ferromagnetic layer 106 is identified with an at rest or default state in which no SOT currents are applied and no external magnetic fields are present, but which is otherwise dependent upon the direction and amplitude of the applied SOT current in the SOT conductor layer 108 and the presence of an external magnetic field, as discussed in further detail herein. The layer stack also includes a non-magnetic layer 104 that is disposed between the magnetic reference layer 102 and the ferromagnetic layer 106. This arrangement of the magnetic reference layer 102, the non-magnetic later 104, and the ferromagnetic layer 106 forms a magnetoresistive element. This magnetoresistive element may represent any suitable type of magnetoresistive element that has a varying conductance that is dependent upon the presence of external magnetic fields in a particular direction of magnetic field sensitivity. The magnetoresistive element may be identified with, for instance, a tunnel magnetoresistance (TMR) junction or a giant magnetoresistance (GMR) junction. Embodiments also include not using a magnetoresistive (MR) junction, but instead measuring the magnetization direction of the ferromagnetic layer 106 utilizing an anisotropic magnetoresistance (AMR) or anomalous Hall effect (AHE). For embodiments that utilize the AMR effect, the resistance of the ferromagnetic layer 106 may be measured while the SOT current is applied. This can be done, for example, by a four-point or two-point technique. For embodiments that utilize the AHE effect, the transverse Hall voltage may be measured while the SOT current is applied.

Figure 8A:
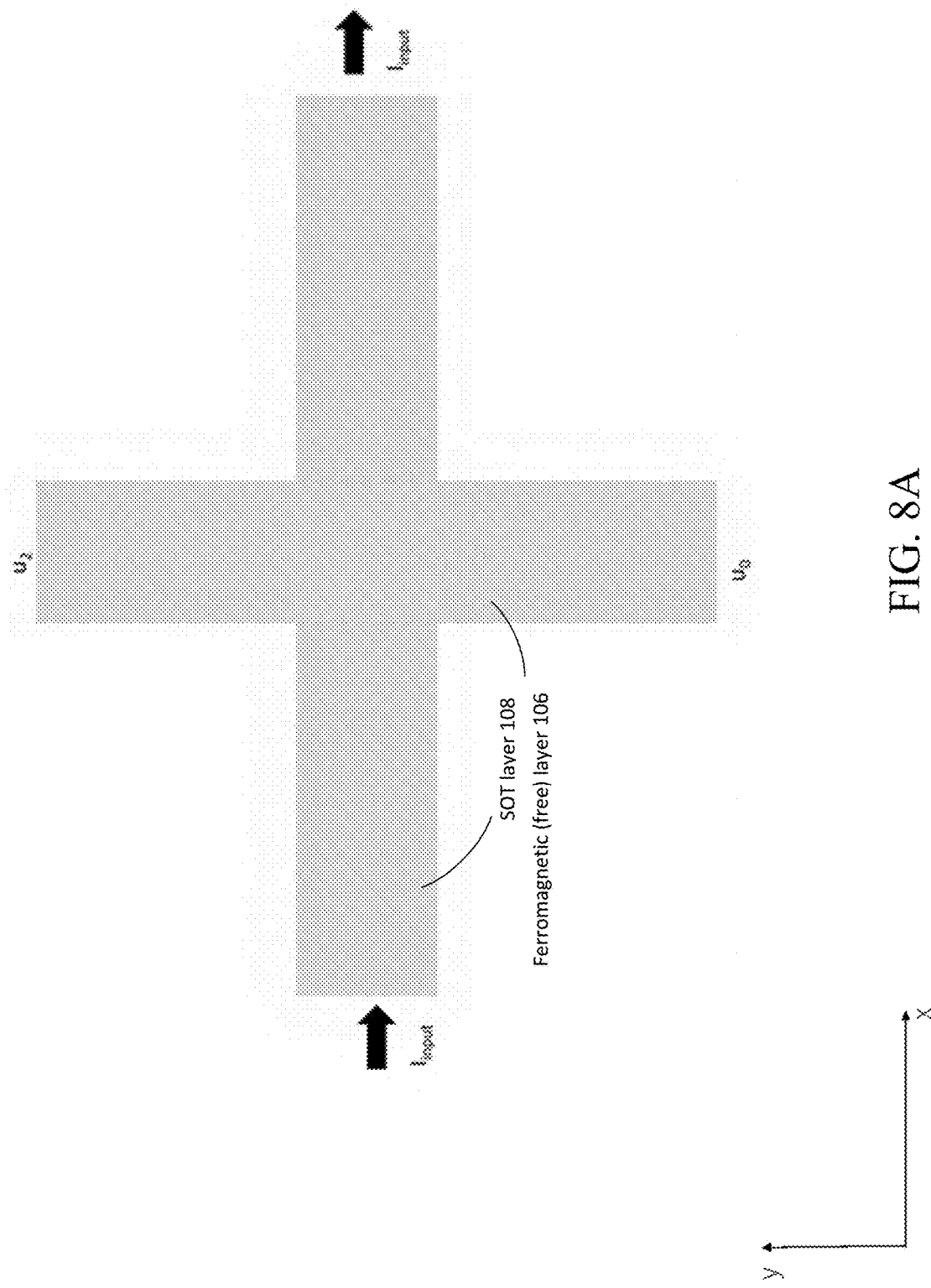
FIGS. 8A illustrates an example sensor configurations in which the readout is performed using the anomalous Hall effect.

For instance, and with reference to FIG. 8A, an example sensor configuration is shown in which the readout is performed using the anomalous Hall effect. The example sensor 800 includes the SOT layer 108 and the ferromagnetic layer 106 stacked on top of one another to form what is referred to as a "Hall cross." In this example, an input current is applied along one arm of the Hall cross, which is referred to as an input arm and is shown in FIG. 8A as extending in the x-direction. The output voltage $u_{out}=u_1-u_0$ is then measured along a second arm of the Hall cross, which is referred to as an output arm and is shown in FIG. 8A as extending in the y-direction. The output voltage thus depends on the perpendicular component of the magnetization in the ferromagnetic layer 106. As further discussed herein, by applying two SOT currents with opposing polarity and subtracting the two output voltages produced in response to each SOT current polarity in this away, the sensor signal is obtained.

For example, if the SOT current is applied that rotates the magnetization direction in the ferromagnetic layer 106 in the ±My direction, an external field in the x-direction will lead to an Mz magnetic field component, which can be detected with the method as described above. In addition, a spinning current principle may be applied in which the input arm and the output arm of the Hall cross 800 are interchanged, and the obtained outputs are combined. In some embodiments, the two outputs are subtracted, while in other embodiments the two outputs are added.

The magnetoresistive element and, in particular, the ferromagnetic layer 106, is positioned adjacent to a spin orbit torque (SOT) conductor layer 108, which may influence the magnetization direction of the ferromagnetic layer 106. Although referred to herein as an SOT conductor layer or simply as an SOT layer and accompanying applied SOT currents, this is by way of example and not limitation, and the magnetization of the ferromagnetic layer 106 may be adjusted due to the SOT effect, the Rashba effect, or any other suitable effect that leads to a strong variation of the magnetization of the ferromagnetic layer 106 due to an adjacent current. Embodiments include the direction of magnetization of the ferromagnetic layer 106 being modified as a function of the direction and amplitude of the applied SOT currents. Thus, the SOT conductor layer 108 may be implemented as any suitable type of material configured to exhibit the SOT effect or other suitable effect in response to the driven SOT currents generated by the control circuitry 110.

The control circuitry 110 may be implemented as any suitable type of hardware, software, or combinations of these, which functions to generate time-varying SOT currents of a particular magnitude and direction (e.g. polarity) and to perform measurements of the conductance of the magnetoresistive element. The control circuitry 110 may be implemented with any suitable configuration of current drivers or other suitable hardware configured to generate the SOT currents within the SOT conductor layer 108, which may be dynamically varied in direction and/or amplitude based upon the particular direction in which external magnetic fields are to be measured by the sensor 100 at any particular time. For example, the SOT current may be applied as a sinusoidal time-varying current, or as a current with alternating polarity, i.e. time-varying with respect to direction. Moreover, the control circuitry 110 may be implemented with any suitable combination of hardware to measure the conductance of the magnetoresistive element in the layer stack as noted above. In an embodiment, the control circuitry 110 is configured to apply an SOT current to the SOT conductor layer 108, as shown in FIG. 1, in opposite directions or polarities at different times. For example, the control circuitry 110 is configured to generate an SOT current within the plane of the SOT conductor layer 108 in one of a first current direction or a second current direction that is antiparallel to the first current direction, and to detect a magnetic field acting externally to the sensor by determining a conductance of the magnetoresistive element that is dependent on the SOT current.

Magnetic field measurements may be performed by the control circuitry 110 in this way by first measuring the conductance of the magnetoresistive element when the SOT current is applied in one direction for a particular amplitude, and then measuring the conductance of the magnetoresistive element when the SOT current is applied in the opposite (i.e. antiparallel) direction (i.e. polarity) at a particular amplitude. Alternatively, the magnetization direction of the ferromagnetic layer 106 may be measured utilizing AHE as noted above, with the measurement occurring while the alternating SOT current is applied (e.g. during application of the SOT current in each of the two polarities). The current amplitudes may be equal to one another to simplify these calculations, although this is not necessary. Thus, the SOT currents are sequentially generated in the SOT conductor layer 108 in this manner to produce the SOT effect in the adjacent magnetoresistive element. Additional details regarding how the external magnetic field strength may be measured using the conductance measurements are further discussed below.

The control circuitry 110 may be coupled to the layer stack using any suitable configuration of wires, buses, etc., to perform these functions. The control circuitry 110 may be implemented as one of more processors and/or processing circuitry, and may execute computer-readable instructions to perform the various functions as discussed in further detail herein. The control circuitry 110 may thus be implemented using any suitable type of architecture and function in accordance with any suitable type of application that uses the sensor measurement data to perform specific functions.

Figure 2A:
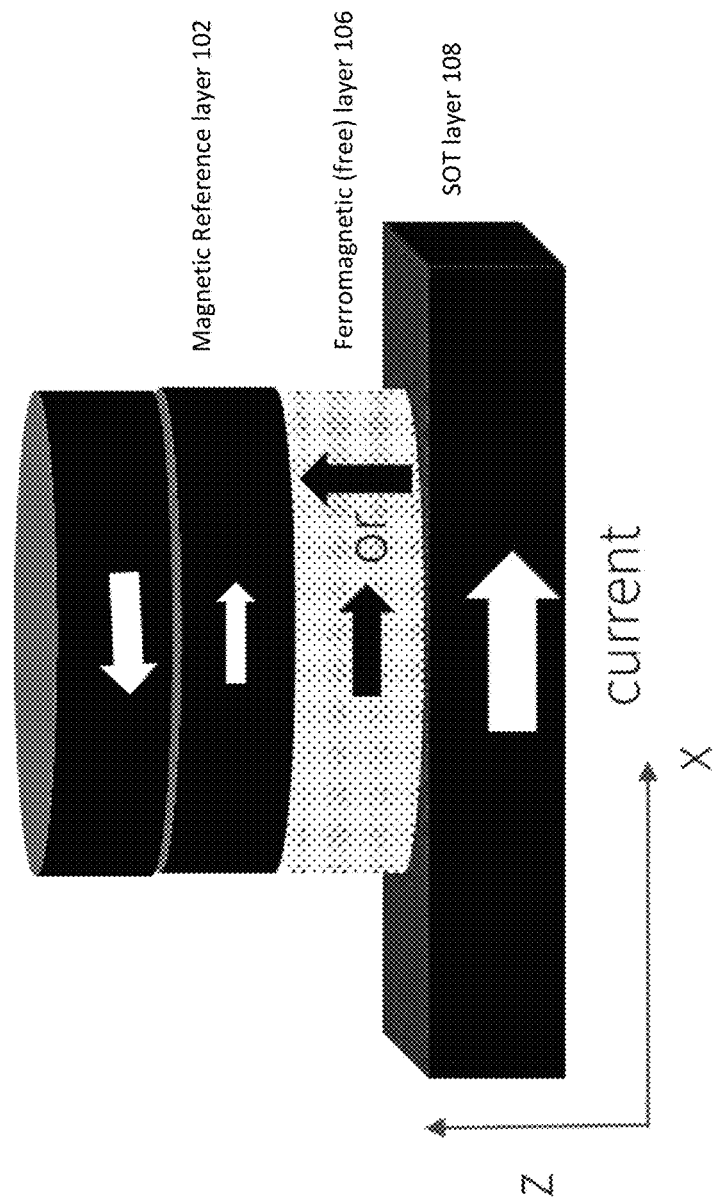
FIGS. 2A and 2B illustrate example sensor configurations comparing an in-plane reference system with an out-of-plane reference system, in accordance with one or more embodiments of the disclosure.
Figure 2B:
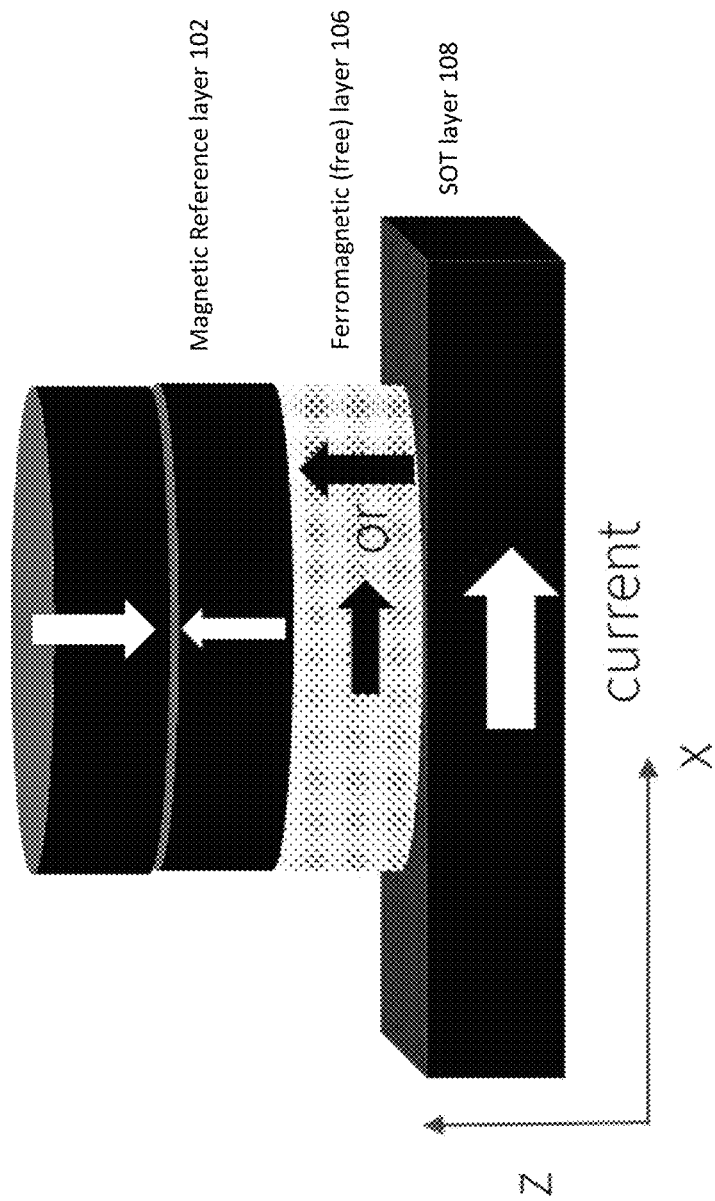

FIGS. 2A and 2B illustrate example sensor configurations comparing an in-plane reference system with an out-of-plane reference system, in accordance with one or more embodiments of the disclosure. In the example shown in FIG. 1, the reference system is implemented as an in-plane reference system, i.e. the magnetic reference layer 102 has a fixed magnetization direction that is parallel to the plane occupied by the magnetic reference layer 102. This is also shown in the example sensor configuration 200 in FIG. 2A. However, in other embodiments the reference system may be implemented as an out-of-plane system, i.e. the magnetic reference layer 102 has a fixed magnetization direction that is perpendicular to the plane occupied by the magnetic reference layer 102. This is shown in the example sensor configuration 250 in FIG. 2B. It is noted that the sensor configurations as shown in both FIGS. 2A and 2B may be identified with the sensor 100 as shown in FIG. 1, although the non-magnetic layer 104 and other components of the sensor 100 as shown in FIG. 1 are not shown for purposes of brevity.

Regardless of the fixed magnetization direction of the magnetic reference layer 102, embodiments include the ferromagnetic layer 106 having a variable magnetization direction that has a default state that is either in-plane (i.e. in the plane occupied by the ferromagnetic layer 106) or out-of-plane (i.e. in a plane perpendicular to the plane occupied by the ferromagnetic layer 106). Again, the default or at rest state may constitute a state in which an SOT current is not applied to the SOT conductor layer 108 and an external magnetic field is not present.

The magnetization direction of the ferromagnetic layer 106 is referred to herein as a variable magnetization direction, in contrast to the fixed magnetization direction of the magnetic reference layer 102, as the magnetization direction of the ferromagnetic layer 106 may be adjusted based upon the amplitude of the SOT current applied in each direction in the SOT conductor layer 108.

For example, the sensor configuration 200 as shown in FIG. 2A has a fixed magnetization direction of the magnetic reference layer 102 that is in-plane, and in the default state the ferromagnetic layer 106 has an in-plane variable magnetization in the ±x direction for example (magnetization direction being referred to herein with an "M" designation, or the ±Mx direction in this example, which are parallel with the x-axis). However, in other examples the in-plane magnetization may be or in the ±y direction or any direction in between the x and y axis. In the absence of an external magnetic field, the application of an SOT current in the SOT conductor layer 108 (i.e. in both directions as noted above) that exceeds a predetermined threshold current value in each direction results in the magnetization direction of the ferromagnetic layer 106 being rotated or tilted to the ±My direction. In other words, when the SOT current is applied in the +x-direction in the SOT conductor layer 108 exceeding a predetermined threshold current value, the variable magnetization direction is tilted from the +Mx direction to align with the +My direction (e.g. parallel with the y-axis). In some embodiments, the SOT current may alternatively align the variable magnetization direction in the −My direction. That is, different SOT materials have either a positive or negative sign of the field and/or damping-like torque term. Hence, depending on the material of the SOT layer 108, the alignment of the variable magnetization direction for a +x SOT current might be +My. Likewise, when the SOT current is applied in the −x-direction in the SOT conductor layer 108 exceeding a predetermined threshold current value, the variable magnetization direction is tilted from the −Mx direction to align with the −My direction. As a result, when an external magnetic field is applied during the application of the SOT current in the ±x directions, the sensor configuration 200 as shown in FIG. 2A is sensitive to external magnetic fields in the z-direction, which are also perpendicular to the in-plane fixed magnetization direction of the magnetic reference layer 102.

As another example, the sensor 250 as shown in FIG. 2B has a fixed magnetization direction of the magnetic reference layer 102 that is out-of-plane, and in the default state the ferromagnetic layer 106 has either an in-plane magnetization or an out-of-plane magnetization. In this example, in the absence of an external magnetic field the application of an SOT current in the SOT conductor layer 108 (i.e. in both directions as noted above) that exceeds a predetermined threshold current value in each direction will result in the magnetization direction of the ferromagnetic layer 106 being rotated or tilted to align with the ±My direction. In other words, when the SOT current is applied in the +x-direction in the SOT conductor layer 108 exceeding a predetermined threshold current value, the variable magnetization direction is tilted from the in-plane or out-of-plane direction to align with the +My or the −My direction. Depending on the sign of the field and damping-like torque term identified with the SOT layer 108, the orientation of the magnetization of the ferromagnetic layer 106 is either in the +My or −My direction. It is important to note that reversing the SOT current polarity will switch the magnetization with respect to the My direction.

As a result, and because the reference system for the sensor 250 has an out-of-plane alignment, when an external magnetic field is applied during the application of the SOT current in the ±x directions, the sensor configuration 250 as shown in FIG. 2B is sensitive to external magnetic fields in the x-direction, which is also perpendicular to the out-of-plane fixed magnetization direction of the magnetic reference layer 102.

Of course, the orientation of the magnetization direction of the ferromagnetic layer 106 at the default state and in the rotated direction, as well as the direction of the SOT currents, may be any suitable arrangement dependent upon the orientation of the sensor and the particular magnetic field component measurements of interest. For instance, the ferromagnetic layer 106 may have a default state in-plane variable magnetization in the ±My direction. In this example, in the absence of an external magnetic field, the application of an SOT current in the SOT conductor layer 108 (i.e. in both directions as noted above) that exceeds a predetermined threshold current value in each direction will result in the magnetization direction of the ferromagnetic layer 106 being rotated or tilted to align with the ±Mx direction. In other words, when the SOT current is applied in the +x-direction in the SOT conductor layer 108 exceeding a predetermined threshold current value, the variable magnetization direction is tilted from the +My direction to align with the +Mx direction. Likewise, when the SOT current is applied in the −x-direction in the SOT conductor layer 108 exceeding a predetermined threshold current value, the variable magnetization direction is tilted from the −My direction to align with the −Mx direction.

Again, and as noted above, in various embodiments the SOT current may alternatively align the variable magnetization direction in the −Mx direction or the +Mx direction deepening upon the particular SOT material used for the SOT layer 108, which may be identified with either a positive or negative sign of the field and/or damping-like torque term. Hence, depending on the material of the SOT layer 108, the alignment of the variable magnetization direction for a +x SOT current might be +Mx (i.e. parallel with the applied SOT current) or −Mx (i.e. antiparallel with the applied SOT current direction). Of course, this also holds true for the alignment of the variable magnetization direction for a −x SOT current. In any event, and because the reference system for the sensor 250 has an out-of-plane alignment, when an external magnetic field is applied during the application of the SOT current in the ±x directions, the sensor configuration 250 as shown in FIG. 2B is sensitive to external magnetic fields in the y-direction, which is also perpendicular to the out-of-plane fixed magnetization direction of the magnetic reference layer 102.

A similar behavior as described above for the sensor configurations 200, 250, which in the examples above use an default state magnetization direction of the ferromagnetic layer 106 that is in-plane, may also be realized when the ferromagnetic layer 106 has a default magnetization direction that is out-of-plane, which may be aligned with the ±Mz direction for example. Such an out-of-plane magnetization direction for the ferromagnetic layer 106 may be implemented in accordance with any suitable type of material that may incorporate an out-of-plane anisotropy. For instance, the out-of-plane anisotropy may be realized by a surface anisotropy or crystalline anisotropy, and may be used to tune the linear range of the sensor device with respect to sensor measurement performed for external magnetic fields in the z-direction, as further discussed herein.

With respect to the anisotropy of the ferromagnetic layer 106, it is noted that the ferromagnetic layer 106 as shown in FIGS. 1, 2A, and 2B is a circular element by way of example and not limitation. Embodiments include the ferromagnetic layer 106 being implemented having any suitable shape and size depending upon the particular application. For instance, the ferromagnetic layer 106 may be implemented having an elliptical shape, a rectangular shape, etc. Shapes with an effective easy axis (i.e. the major axis) in-plane may be particularly useful to tune the sensitivity of the sensor.

Thus, the ferromagnetic layer 106 may have an anisotropy that is calculated using example material parameters of $J_s=0.5$ T and a thickness $t=2.5$ nm. Due to the thin film structure, the shape anisotropy may be calculated using Equation 1 below as follows:

$$K_{1,shape} = -\frac{1}{2}\frac{J_s^2}{\mu_0}. \quad \text{Eqn. 1}$$

Continuing this example, it is assumed that an elliptical shape is used with an easy axis in the (1, 0, 0) direction, with an effective shape anisotropy $K_1$. In addition to this anisotropy the shape anisotropy according to Eqn. 1 appears. Due to the negative sign of the shape anisotropy, this relates to in-plane anisotropy, where the magnetization is oriented preferentially parallel to the film plane. That is, to increase the sensitivity of the sensor, an additional easy axis in the z-direction may be designed. This can be realized by crystalline anisotropy or interface anisotropy. Examples include layer stacks such as CoFe alloys, which may include CoFeB deposited on MgO. Other materials used for the implementation of the ferromagnetic layer 106 for this purpose may include multilayers such as Co/Pt, Fe/Pt, Co/Fe, or any suitable material in which an interface coupling between two layers leads to an out of-plane anisotropy. Moreover, to increase the perpendicular anisotropy, layers of W might be included. In any event, the total anisotropy is provided below in Equation 2 as follows:

$$K_{1,\mathit{eff}} = K_{1,\mathit{shape}} + K_1 \qquad \text{Eqn. 2:}$$

Thus, if the sensitivity needs to be increased, the anisotropy $K_1$ has to have a positive value to partly compensate for the shape anisotropy. For cases in which a higher linear regime is required, the anisotropy $K_1$ might have a negative value.

As another example, a sensor design may rely upon on a larger $K_1$ value that completely overcomes the shape anisotropy to obtain an out-of-plane anisotropy of the magnetization at zero field and zero current. A linear regime can thus be increased by increasing the magnitude of the shape anisotropy. This can be realized by increasing $J_s$. For a high sensitivity, a small $J_s$ is required.

Again, to obtain the sensor signal, a current is applied in the SOT conductor layer 108. As noted above, for sufficiently high currents, i.e. currents that exceed a predetermined threshold current value, the variable magnetization direction of the ferromagnetic layer 106 is tilted or rotated into the direction of the spin accumulation produced by the spin orbit torque (SOT). In the example noted above for FIGS. 2A and 2B, the magnetization direction of the ferromagnetic layer 106 is in the +x and −x direction in the default state, and thus the magnetization direction of the ferromagnetic layer 106 is rotated into the +My or −My direction, depending on the current polarity, if no other external magnetic field acts on the magnetization.

Continuing this example, during the application of the SOT current, if an external magnetic field in the z-direction is applied, the magnetization direction of the ferromagnetic layer 106 rotates out of the y-direction. Depending on the current polarity, the magnetic states as shown in Table 1 below are obtained.

TABLE 1

Equilibrium orientation of the magnetization
for an external field of Bz = −50 mT.

| SOT Current (A/m$^2$) | Mx | My | Mz |
|---|---|---|---|
| 5e10 | −0.1 | −0.99 | −0.1 |
| −5e10 | +0.1 | +0.99 | −0.1 |

Since the Mx component has opposite signs for positive and negative current, a suitable sensor signal is represented in Equation 3 below as follows:

$$\text{signal} = M_x(+I) - M_x(-I) \qquad \text{Eqn. 3:}$$

Depending upon the particular configuration and orientation of the sensor 100, the sensor signal may alternatively represent magnetic field components in the y- and z-directions, as represented in Equations 4 and 5 below as follows:

$$\text{signal}_y = M_y(+I) - M_y(-I) \qquad \text{Eqn. 4:}$$

$$\text{signal}_z = M_z(+I) - M_z(-I) \qquad \text{Eqn. 5:}$$

If the sensor signal is obtained according to Equation 5, then the reference system (the fixed magnetization direction of the magnetic reference layer 102) should be oriented parallel with the x-axis.

Hence, the magnetization direction of the ferromagnetic layer 106 at the default state (e.g. ±Mx) and the fixed magnetization direction of the magnetic reference layer 102 (±Mx) are orthogonal to the rotated magnetization direction of the ferromagnetic layer 106 (±My) when the SOT currents are applied having an amplitude exceeding a predetermined threshold value.

As a result, if external magnetic fields are applied in the x and y direction, magnetic states according to Tables 2 and 3 are obtained.

TABLE 2

Equilibrium orientation of the magnetization
for an external field of Bz = −50 mT

| SOT Current (A/m$^2$) | Mx | My | Mz |
|---|---|---|---|
| 5e10 | −0.87 | 0.1 | 0.47 |
| −5e10 | −0.87 | −0.1 | −0.47 |

TABLE 3

Equilibrium orientation of the magnetization
for an external field of By = −10 mT

| SOT Current (A/m$^2$) | Mx | My | Mz |
|---|---|---|---|
| 5e10 | 0 | −1 | 0 |
| −5e10 | 0 | −1 | 0 |

Hence, the sensor according to Table 2 will be sensitive to fields in x-direction if the z-component of the magnetization is measured. This can be done for example by using a reference system that is oriented out of plane (±Mz). Alternatively, the sensor signal may be obtained using the Hall Effect using a Hall cross configuration, as discussed in further detail herein.

Figure 3A:
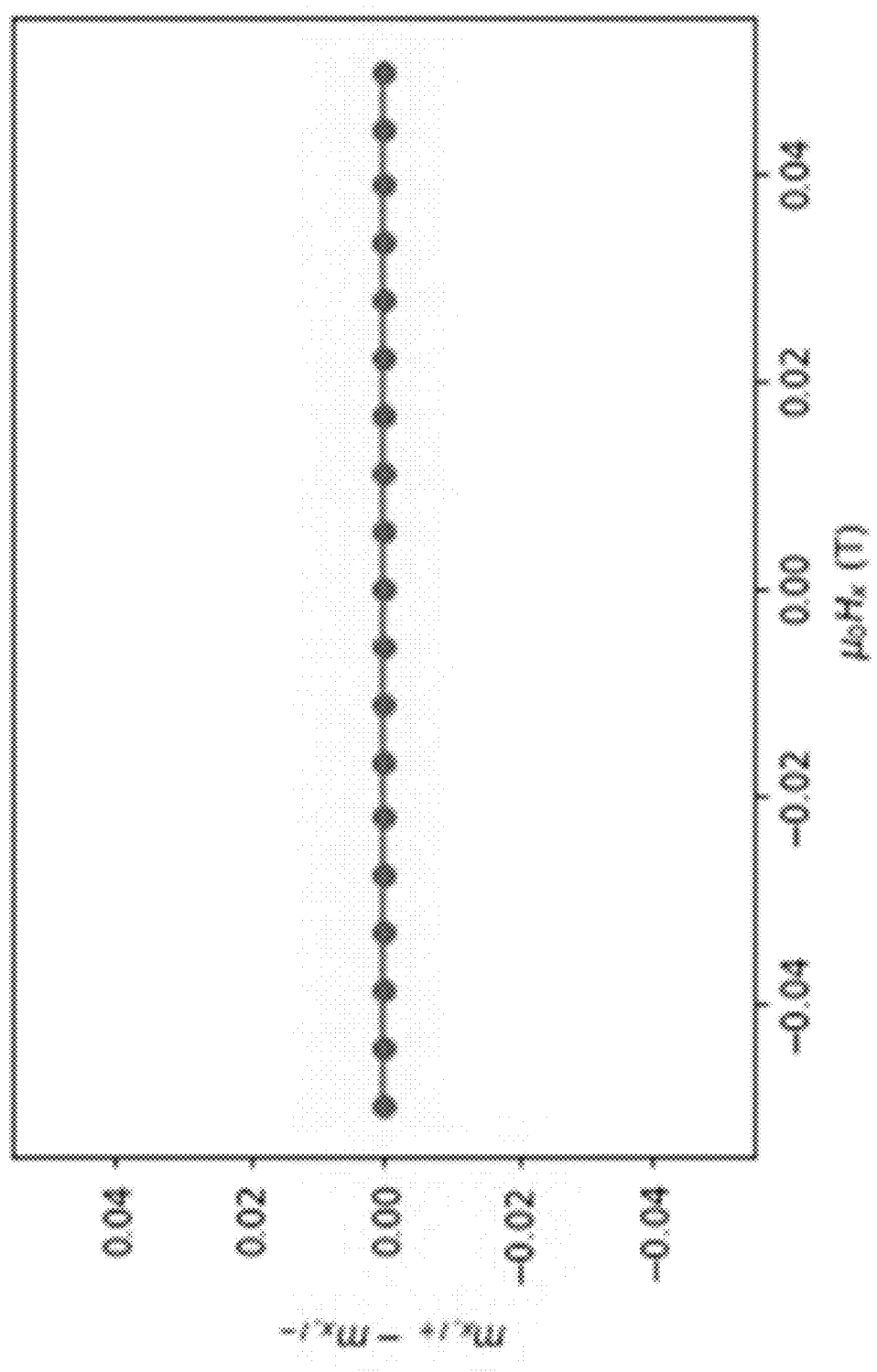
FIG. 3A illustrates an example sensor response with respect to external magnetic fields in the x-direction, in accordance with one or more embodiments of the disclosure.
Figure 3B:
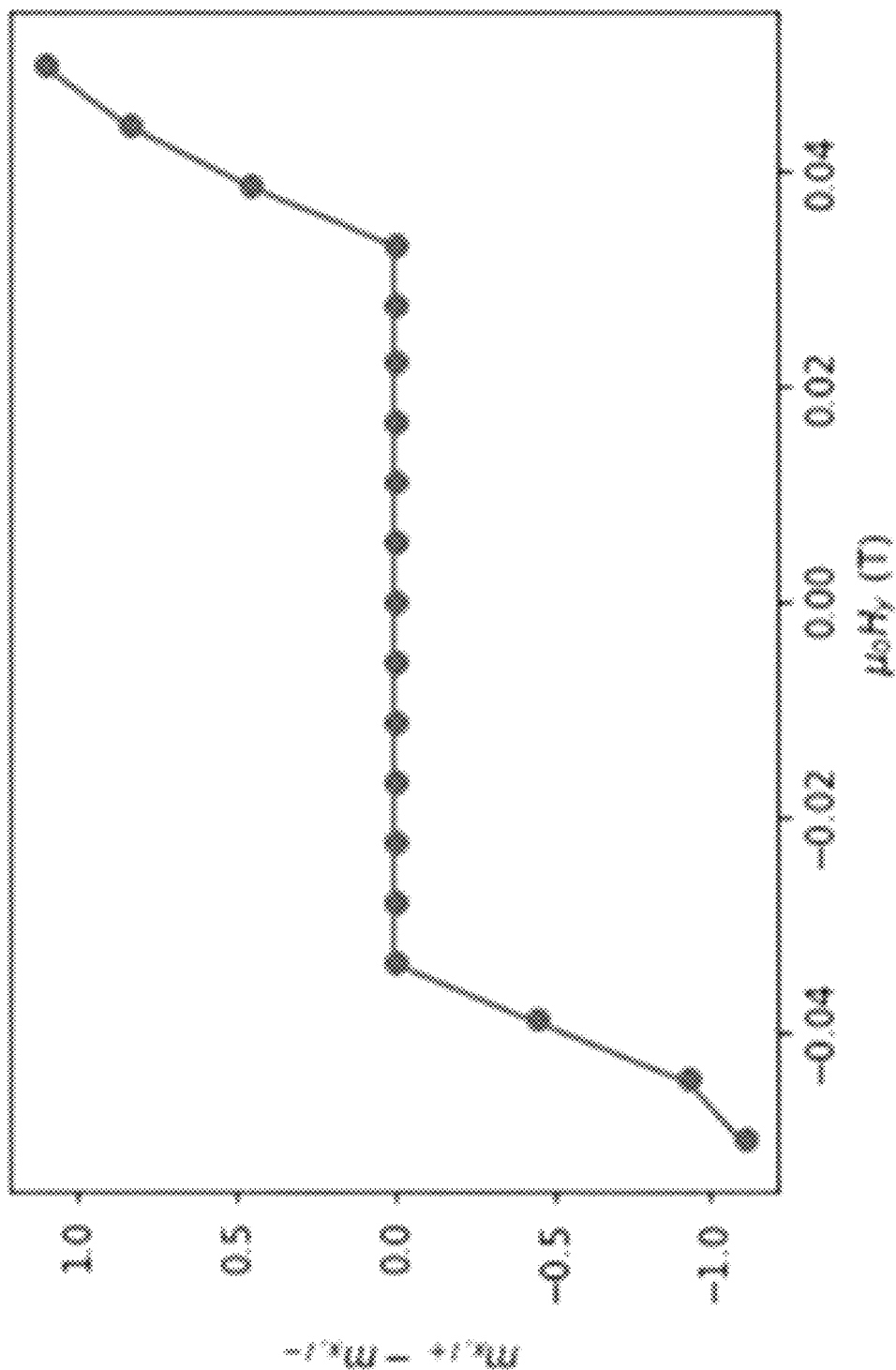
FIG. 3B illustrates an example sensor response with respect to external magnetic fields in the y-direction, in accordance with one or more embodiments of the disclosure.
Figure 3C:
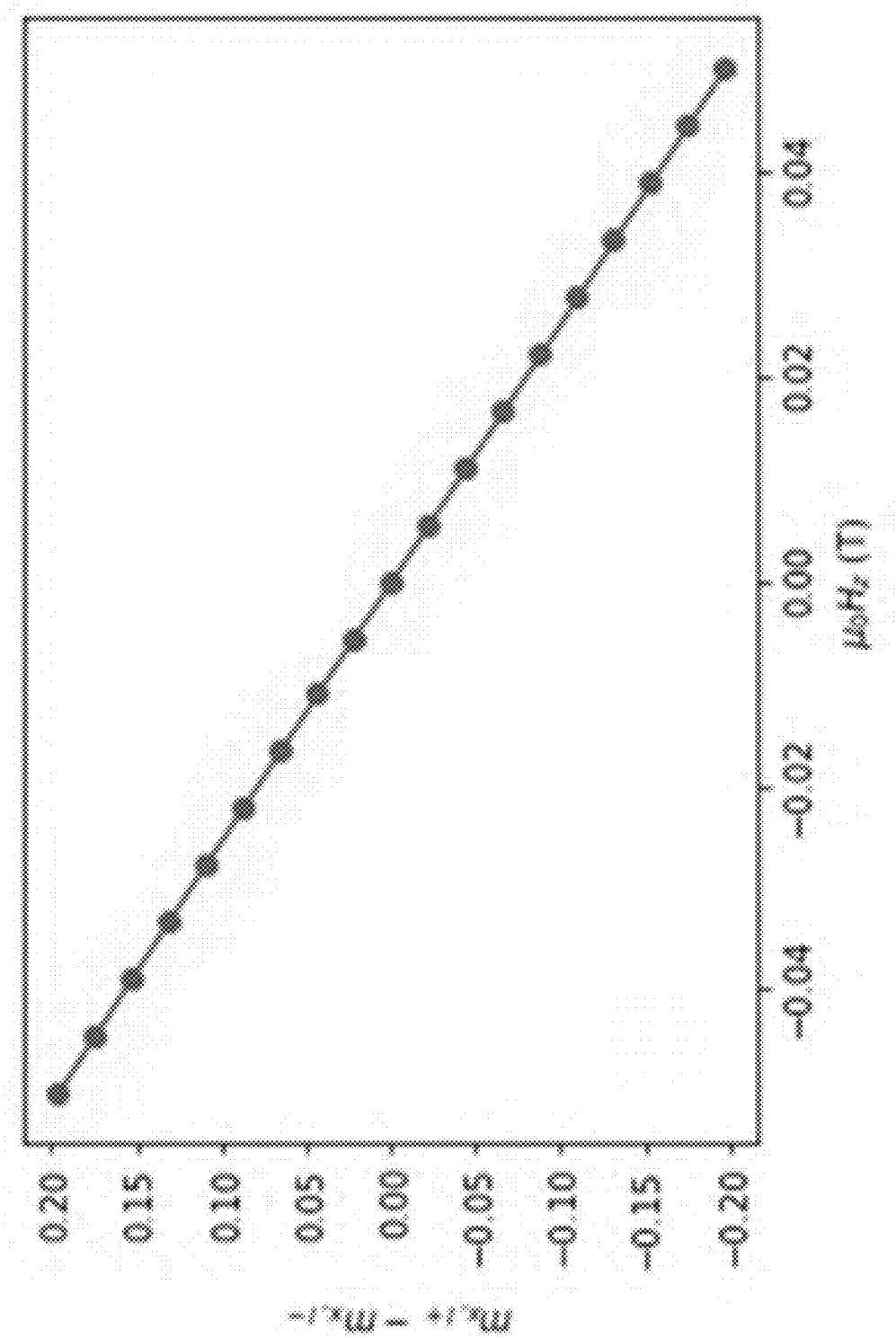
FIG. 3C illustrates an example sensor response with respect to external magnetic fields in the z-direction, in accordance with one or more embodiments of the disclosure.

FIGS. 3A-3C illustrate examples of the response of the sensor 100 with respect to external magnetic fields in the x-direction, y-direction, and z-direction, respectively. In particular, the graphs shown in FIGS. 3A-3C illustrate the sensor signal as function of external magnetic fields in the x-, y- and z-directions. The sensor signal in each case is the result of the control circuitry 110 measuring the conductance of the magnetoresistive element of the sensor 100 as discussed herein. In this scenario, the sensor signal is obtained by measuring the x-components of the magnetization in the ferromagnetic layer 106. In the examples shown in FIGS. 3A-3C, the sensor 100 has a configuration as discussed above with reference to the sensor configuration 200 as shown in FIG. 2A, which enables the measurement of external magnetic fields in the z-direction when the SOT currents are applied having an amplitude that exceeds the predetermine threshold value. The sensor signals as shown in FIGS. 3A-3C are the result of the control circuitry 110 performing two sequential measurements of the conductance of the magnetoresistive element of the sensor 100, one while a respective SOT current is applied in each direction as noted above, and taking the difference between these two signals. Thus, the sensor signals as shown in FIGS. 3A-3C represent differential sensor signal measurements that may be correlated to external magnetic field strength measurements in each of the x, y, and x-directions, respectively.

For the example sensor signal measurements as shown in FIGS. 3A-3C, an SOT current strength is $j=5e10$ A/m$^2$, which is assumed to exceed the predetermined threshold current value as noted herein. For this SOT current amplitude, it is observed that over a particular linear range of external magnetic field strengths, the sensor 100 is only sensitive to external magnetic fields in the z-direction, as illustrated in FIG. 3C.

In other words, when configured as the sensor configuration 200 as shown in FIG. 2A, the sensor uses an in-plane magnetization of the ferromagnetic layer 106, but shows a significant sensitivity only for external magnetic fields in the z-direction. Embodiments include tuning the linear range of operation of the sensor 100 by further adjusting the SOT current strength. An example of performing tuning of the linear operating range of the sensor 100 by increasing the SOT current strength is shown in FIGS. 4A-4B.

Figure 4A:
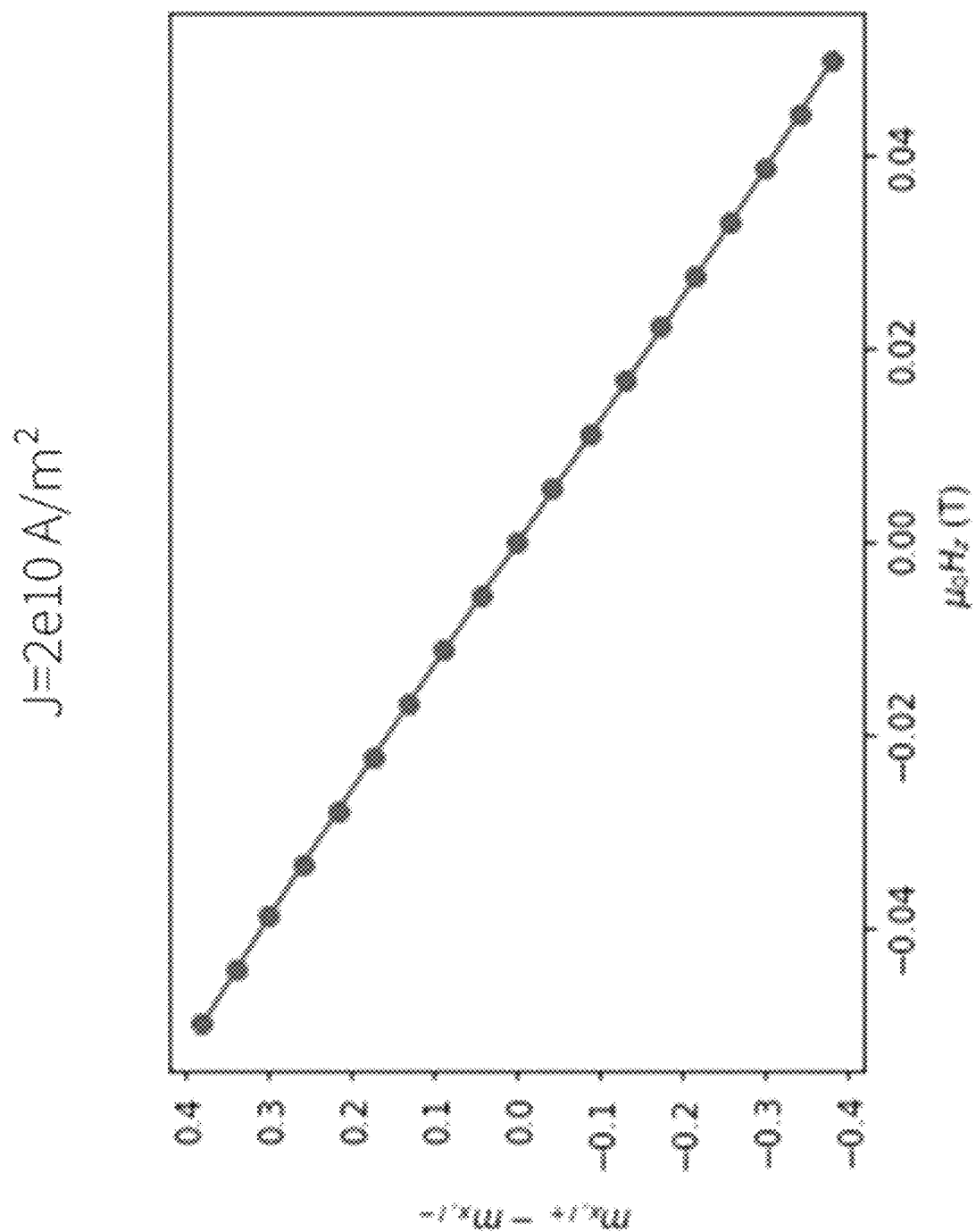
FIG. 4A illustrates an example sensor response with respect to external magnetic fields in the z-direction that uses an increased SOT current strength to demonstrate tuning of linear sensor range, in accordance with one or more embodiments of the disclosure.
Figure 4B:
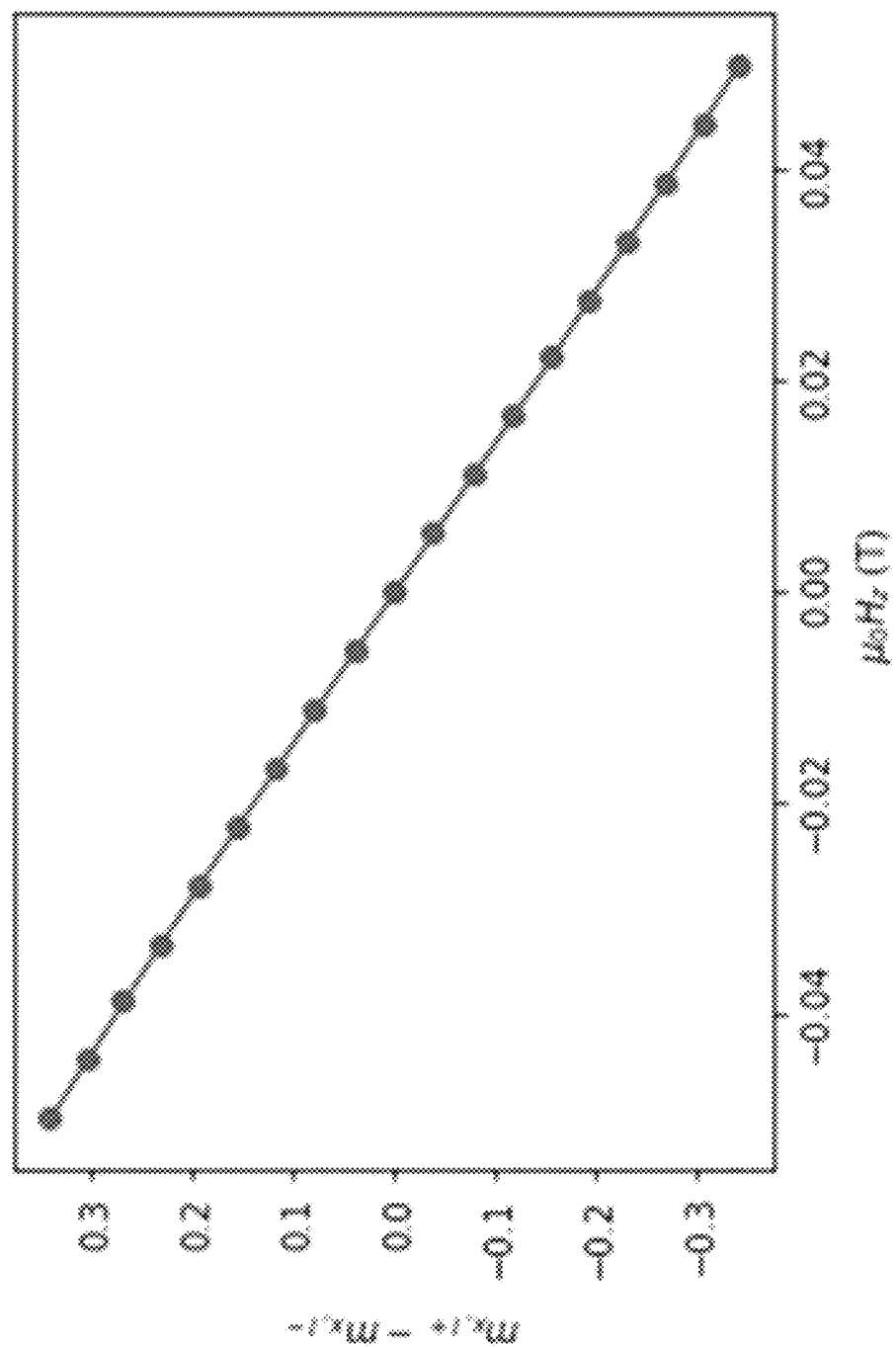
FIG. 4B illustrates an example sensor response with respect to external magnetic fields in the z-direction with a further increased SOT current strength to demonstrate tuning of linear sensor range, in accordance with one or more embodiments of the disclosure.

FIGS. 4A and 4B illustrate the sensor measurements of external magnetic fields in the z-direction as shown in FIG. 3C, but represent the signal measurements with respect to increased SOT current amplitudes. The sensor response as shown in FIGS. 4A and 4B use SOT current strength values that are assumed to exceed the predetermined threshold value as noted herein. For instance, the sensor response as shown in FIG. 4A is with respect to an SOT current strength of $j=2e10$ A/m$^2$, whereas the sensor response as shown in FIG. 4B is with respect to an SOT current strength of $j=2e11$ A/m$^2$.

Hence, depending on the particular application, the sensitivity of the sensor 100 may be tuned. It is also noted that in the absence of an external magnetic field but an SOT current that exceeds the predetermined threshold value as noted herein, the x-component of the magnetization in the ferromagnetic layer 106 is zero. Thus, if an external magnetic field is applied in the z-direction, the magnetization in the ferromagnetic layer increases the |Mx| component. This is an unusual effect that is not observed in any state of the art for GMR or TMR layers without the use of the SOT effect.

Figure 5:
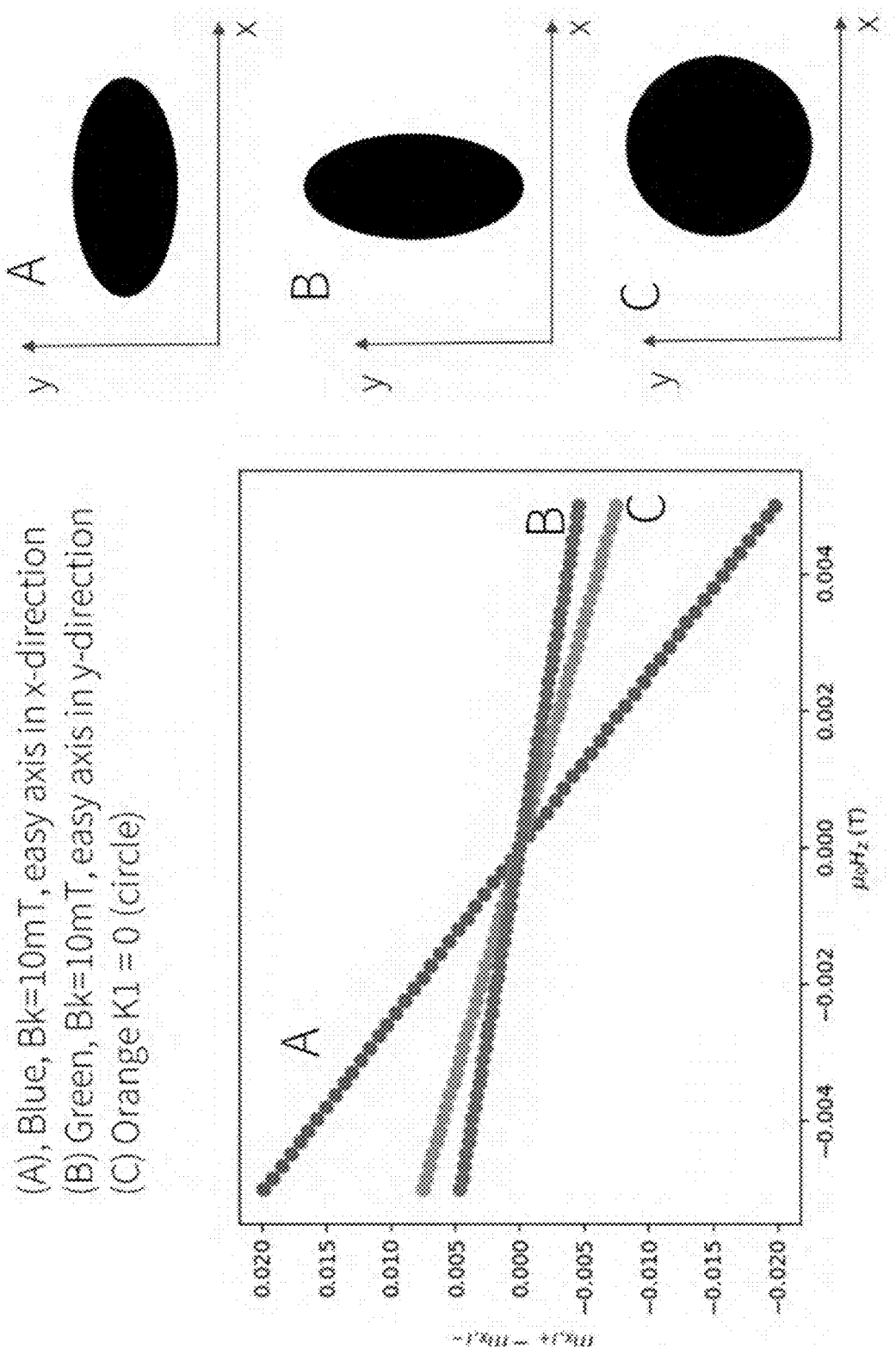
FIG. 5 illustrates an example sensor response with respect to different shapes and orientations of the ferromagnetic layer, in accordance with one or more embodiments of the disclosure.

Again, it is noted that the ferromagnetic layer 106 may be implemented having any suitable shape, such as an elliptical shape versus a circular shape. Assuming that the applied SOT current exceeds the predetermined threshold value as discussed herein, similar sensor response or transfer curves may be obtained having different sensitivities based upon the shape and orientation of the ferromagnetic layer 106. Thus, in addition to the in-plane shape anisotropy, shape anisotropy in the x-direction or the y-direction also occurs. Examples of different sensor response curves are shown in FIG. 5, which correspond to the ferromagnetic layer 106 having an elliptical shape with the easy axis in the x direction (configuration A), the ferromagnetic layer 106 having an elliptical shape with the easy axis in the y direction (configuration B), and the ferromagnetic layer 106 having an circular shape (configuration C).

Figure 6:
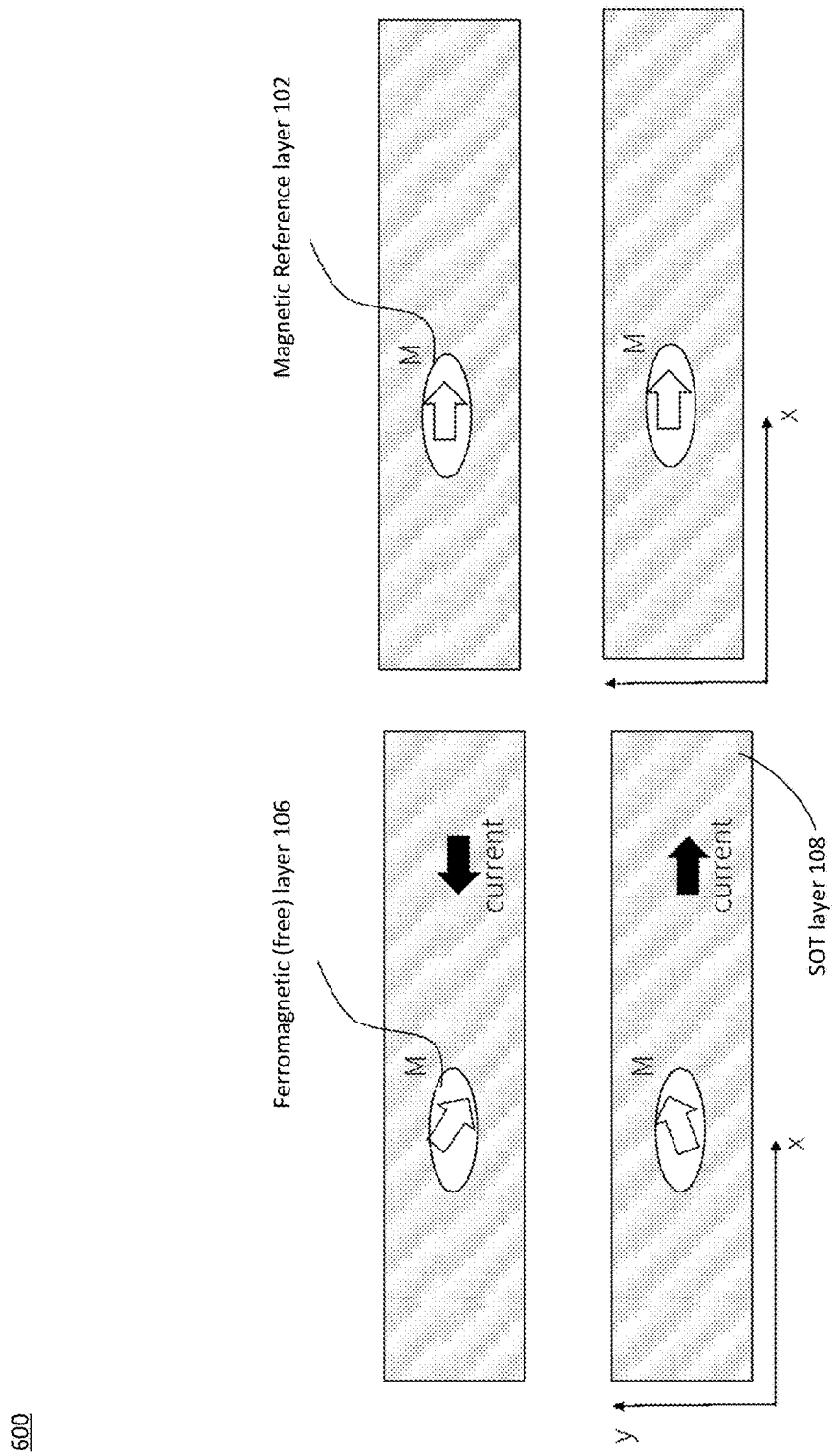
FIG. 6 illustrates an example sensor configuration that enables the adjustment of the direction of sensitivity as a function of SOT current amplitude, in accordance with one or more embodiments of the disclosure.

With respect to the implementation of the ferromagnetic layer 106 in the configuration A, an interesting effect is observed when the SOT current strength is reduced. That is, for a sufficiently small current (e.g. less than the predetermined threshold SOT current as discussed herein) the magnetization of the ferromagnetic layer 106 remains close to the +Mx (or −Mx) directions, and the SOT current does fully rotate the magnetization into the +My (or −My) directions. Hence, the applied SOT current for this lower SOT current scenario only slightly modulates the magnetization around the equilibrium state, which is close to the x-axis in this example due to the shape anisotropy, as shown in FIG. 6. FIG. 6 illustrates how changing the current strength of the SOT current changes the direction in which the sensor 100 is sensitive to external magnetic fields. In the example shown in FIG. 6, the sensor 100 is sensitive to external magnetic fields in the y-direction for the lower SOT current scenario.

Thus, and as noted above, the application of a sufficiently high SOT current (i.e. one that exceeds a predetermined threshold value) may be implemented to adjust the axis of sensitivity of the sensor 100 to external magnetic fields from in-plane (i.e. in the plane of the ferromagnetic layer 106) to out-of-plane (i.e. perpendicular to the plane of the ferromagnetic layer 106), or vice-versa. Thus, by implementing a ferromagnetic layer 106 having shape anisotropy as shown in FIG. 6, the SOT current amplitude may be used to switch the plane of sensitivity of the sensor 100 with respect to detecting external magnetic fields. For instance, for the sensor configuration 200 as shown in FIG. 2A using the configuration as shown in FIG. 6, SOT currents may be applied that are less than the critical (i.e. predetermined threshold) current amplitude to measure external magnetic fields in the ±y directions, while increasing the SOT current amplitude to exceed the predetermined threshold results in the sensor configuration 200 being sensitive to external magnetic fields measurements in the ±z directions. As noted above, this is due to the rotation of the variable magnetization direction of the ferromagnetic layer 106 at the higher critical SOT current values.

Figure 7:
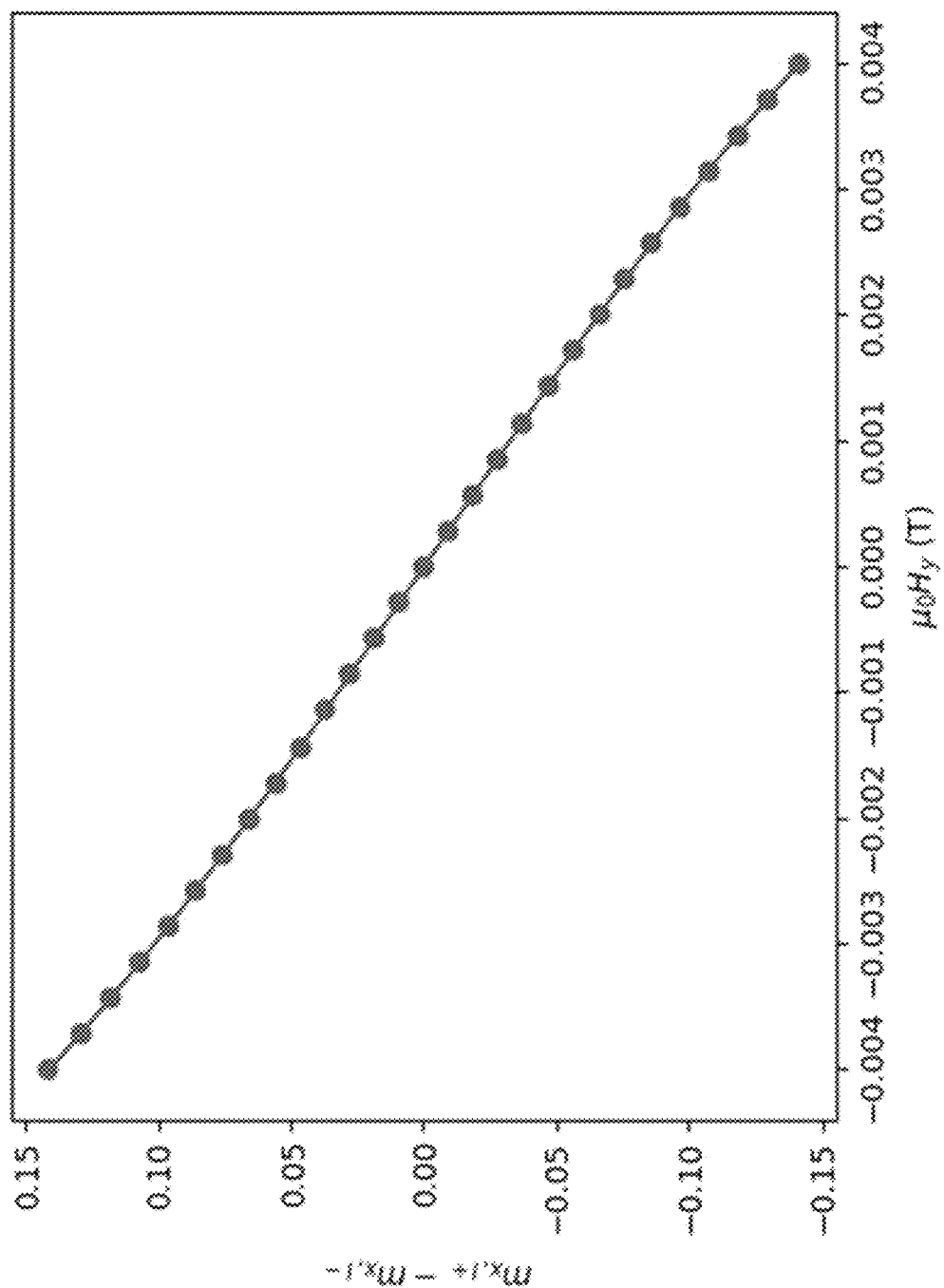
FIG. 7 illustrates an example sensor response for the sensor configuration as shown in FIG. 6 with respect to external magnetic fields in the y-direction, in accordance with one or more embodiments of the disclosure.

An example of in-plane sensitivity to external magnetic fields exhibited by the sensor configuration as shown in FIG. 6 is shown in FIG. 7 using low current SOT currents (i.e. SOT currents less than the critical current amplitude). FIG. 7 illustrates a sensor response for the sensor configuration 200 as shown in FIG. 2A using the configuration as shown in FIG. 6 with respect to external magnetic fields in the y-direction. With continued reference to FIG. 7, the sensor signal is obtained via the control circuitry 110 in a sequential and differential manner as discussed above with respect to the use of the higher SOT current values. The response of the sensor signal as shown in FIG. 7 illustrates sensitivity of the sensor 100 to external magnetic fields in the y-direction using the elliptically-shaped ferromagnetic layer 106. As shown in FIG. 7, an easy axis in the x-direction is assumed and an external magnetic field of 10 mT is applied in the y-direction. The elliptically-shaped ferromagnetic layer 106 may be realized by an elongated shape in x-direction.

Of course, by producing an additional sensor in which the easy axis and the current direction is rotated by 90°, the sensor further becomes sensitive to magnetic fields in an orthogonal in-plane direction (i.e. in the x-direction in this example). For such a configuration, the sensor is sensitive to external magnetic fields in the z-direction for large SOT currents exceeding the predetermined threshold current level, and is also sensitive to external magnetic fields in an in-plane direction (e.g. the x- or y-direction) for small SOT currents that are less than the predetermined threshold current value. In this way, an integrated dual-sensor device may be implemented as part of the same layer stack to detect external magnetic fields in each of the x-, y-, and z-directions.

Figures 8B, 8C:
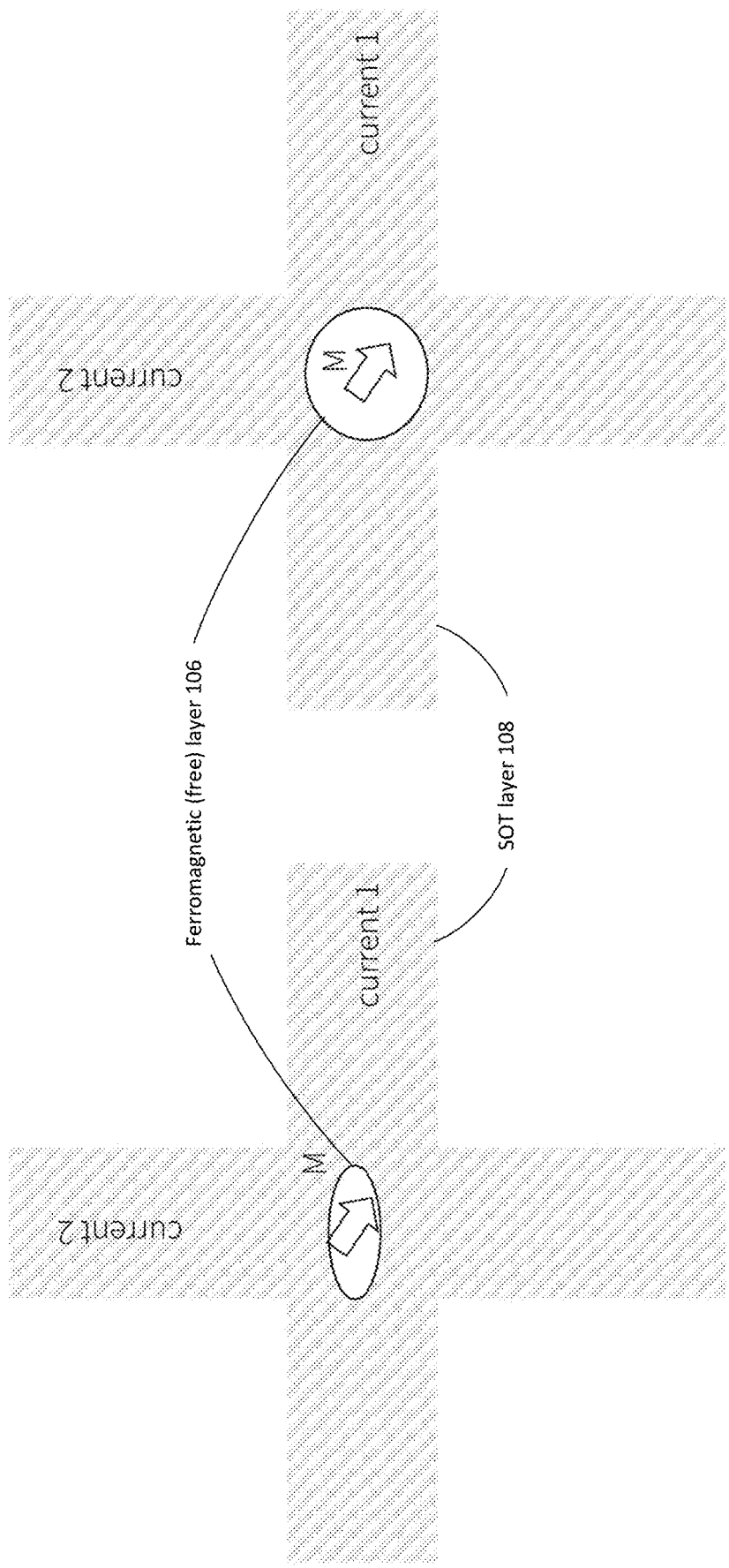
FIGS. 8B and 8C illustrate example sensors that are sensitive to external magnetic fields in the x-, y-, and z-directions, in accordance with one or more embodiments of the disclosure.

In an embodiment, the sensor 100 may be modified in this manner to be sensitive to external magnetic fields in each of the x-, y-, and z-directions by sequentially detecting external magnetic fields in each of these directions as part of a single integrated sensor device. For instance, the sensor 100 may be implemented by modifying the SOT conductor layer 108 in the shape of a cross, as shown in FIGS. 8B and 8C as the sensor configurations 850, 875, respectively, which is contained in the x-y plane and extends in both the x- and y-directions. The ferromagnetic layer 106 may be implemented as having any suitable shape, such as the elliptical shape as shown in FIG. 8B or the circular shape as shown in FIG. 8C. The ferromagnetic layer 106 may of course have any other suitable shape and/or orientation depending upon the particular application.

Again, the SOT current may be applied as a sinusoidal time-varying current, or as a current with alternating polarity, i.e. time-varying with respect to direction. With continued reference to FIGS. 8B and 8C, an SOT current may be applied in the +y-direction (current 2) that exceeds the predetermined threshold value, thereby rotating the magnetization direction of the sensor configurations 800, 850 into the +Mx direction (and in the −Mx direction when the SOT current in the opposite polarity is applied). Once the magnetization direction of the ferromagnetic layer 106 is stabilized in the ±Mx direction in this manner, another SOT current is applied in the x-direction (current 1) having a smaller current value (e.g. less than the predetermined threshold current value). This smaller current 1 may be used to modulate the magnetization direction of the ferromagnetic layer 106 around the ±Mx direction as discussed before, thus achieving sensitivity to external magnetic fields in the y-direction. By reversing the two currents, i.e. using the current 1 as the larger SOT current, the sensor configurations 800, 850 may be sensitive to external magnetic fields in the x-direction. Furthermore, by applying only the current 1 having an amplitude larger than the predetermined threshold current value, the sensor configurations 800, 850 may be sensitive to external magnetic fields in the z-direction by evaluating the signal as noted above, which is sensitive to the Mx magnetization direction of the ferromagnetic layer 106.

Moreover, and with respect to the sensor designs 850, 875 as shown in FIGS. 8B and 8C, embodiments include implementing only one arm (either the elongated arm in the x-direction or the elongated arm in the y-direction) for the application of the SOT current. For example, if the SOT current is applied only in the elongated arm in the x-direction, both the field-like and damping-like torque term align the direction of magnetization of the ferromagnetic layer 106 parallel to the y-axis. If the reference system is aligned in the ±x direction, such a sensor configuration enables a sensitivity to magnetic fields in the x-direction, since an external magnetic field then rotates the direction of magnetization of the ferromagnetic layer 106 into the x-direction. The read out implementation in such a scenario may utilize an xMR effect, as noted herein. Furthermore, if the SOT current is applied in the elongated arm in the y-direction, and the reference layer 102 has a fixed magnetization direction oriented in the y-axis, the sensor configuration would be sensitive to magnetic fields in the y-direction.

Figure 9:
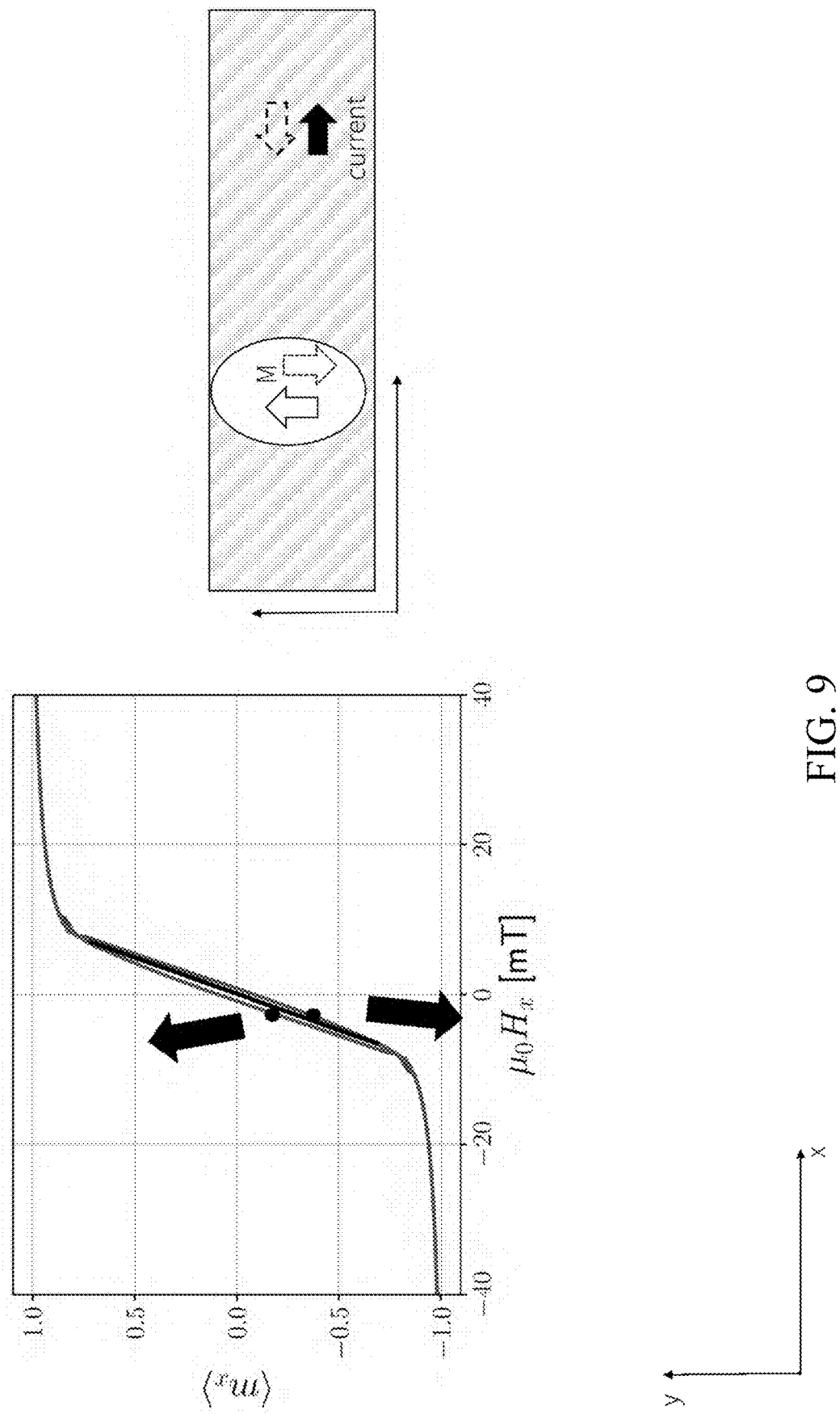
FIG. 9 illustrates a reduction in hysteresis by switching the magnetization direction of the ferromagnetic layer using SOT currents.

FIG. 9 illustrates a reduction in hysteresis by switching the magnetization direction of the ferromagnetic layer using the SOT currents. For example, and as noted above with reference to FIGS. 8B, 8C, when the SOT cross configuration is implemented, one of the currents (e.g. current 2) may be used to switch the direction of magnetization of the ferromagnetic layer into a well-defined equilibrium state (e.g. +Mx or −Mx). This may occur prior to the signal measurement, which is performed after the application of current 1. This allows for a reduction in hysteresis as shown in FIG. 9. It is noted that FIG. 9 illustrates curves for two different sensor states, with the measured signal being the average of the resistance of these two states.

Figure 10:
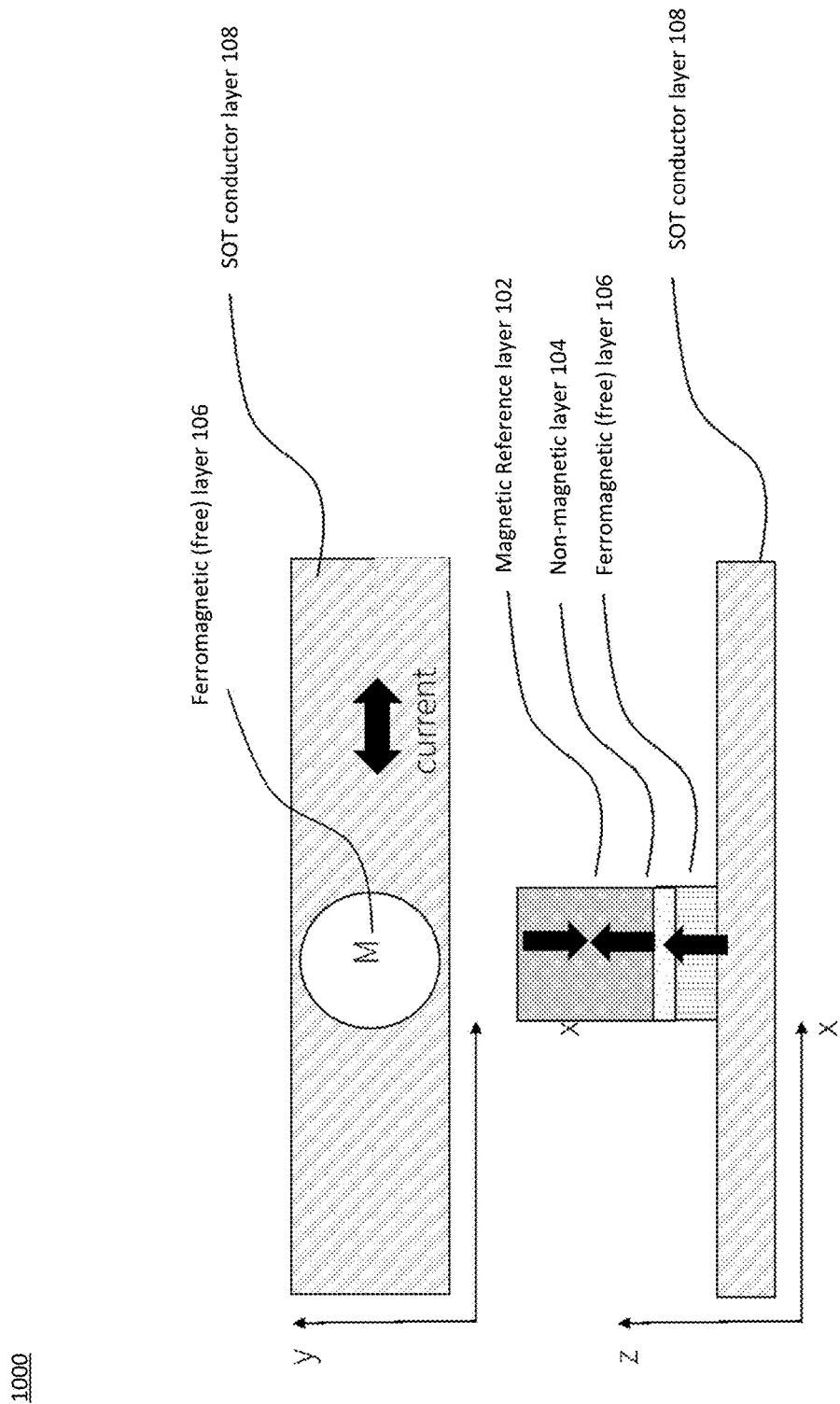
FIG. 10 illustrates an example sensor configuration with an out-of-plane reference system and out-of-plane ferromagnetic layer, in accordance with one or more embodiments of the disclosure.

FIG. 10 illustrates an example sensor configuration with an out-of-plane reference system and an out-of-plane ferromagnetic layer, in accordance with one or more embodiments of the disclosure. The sensor 1000 as shown in FIG. 10 includes the same layer stack components as the sensor 100 as discussed herein with reference to FIG. 1, with additional components being omitted for purposes of brevity. Again, both of the sensors 100, 1000 (as well as the other sensors discussed herein) may implement ferromagnetic layers having any suitable shape, and are not limited to the circular shapes as shown. The sensor 1000 differs from the sensor 100 as shown in FIG. 1 with respect to the orientation of the fixed magnetization of the magnetic reference layer 102, which is out-of-plane compared to the in-plane reference system of the sensor 100. Thus, the sensor 1000 may be identified with the sensor configuration 250 as shown and described herein with reference to FIG. 2B. The sensor 1000 also comprises a ferromagnetic layer 106 that has a magnetization direction in the default state that is also out-of-plane, i.e. perpendicular to the plane of the ferromagnetic layer 106, or in the z-direction in the example as shown in FIG. 10. The out-of-plane default state of the ferromagnetic layer 106 may be implemented, for instance, by an interface anisotropy such as (CoFeB/MgO), a crystalline anisotropy, or via the use of a multilayer stack. In other embodiments, and as noted herein, only the reference system is out-of-plane and the magnetization direction of the ferromagnetic layer 106 is in-plane at the default state.

Figure 11:
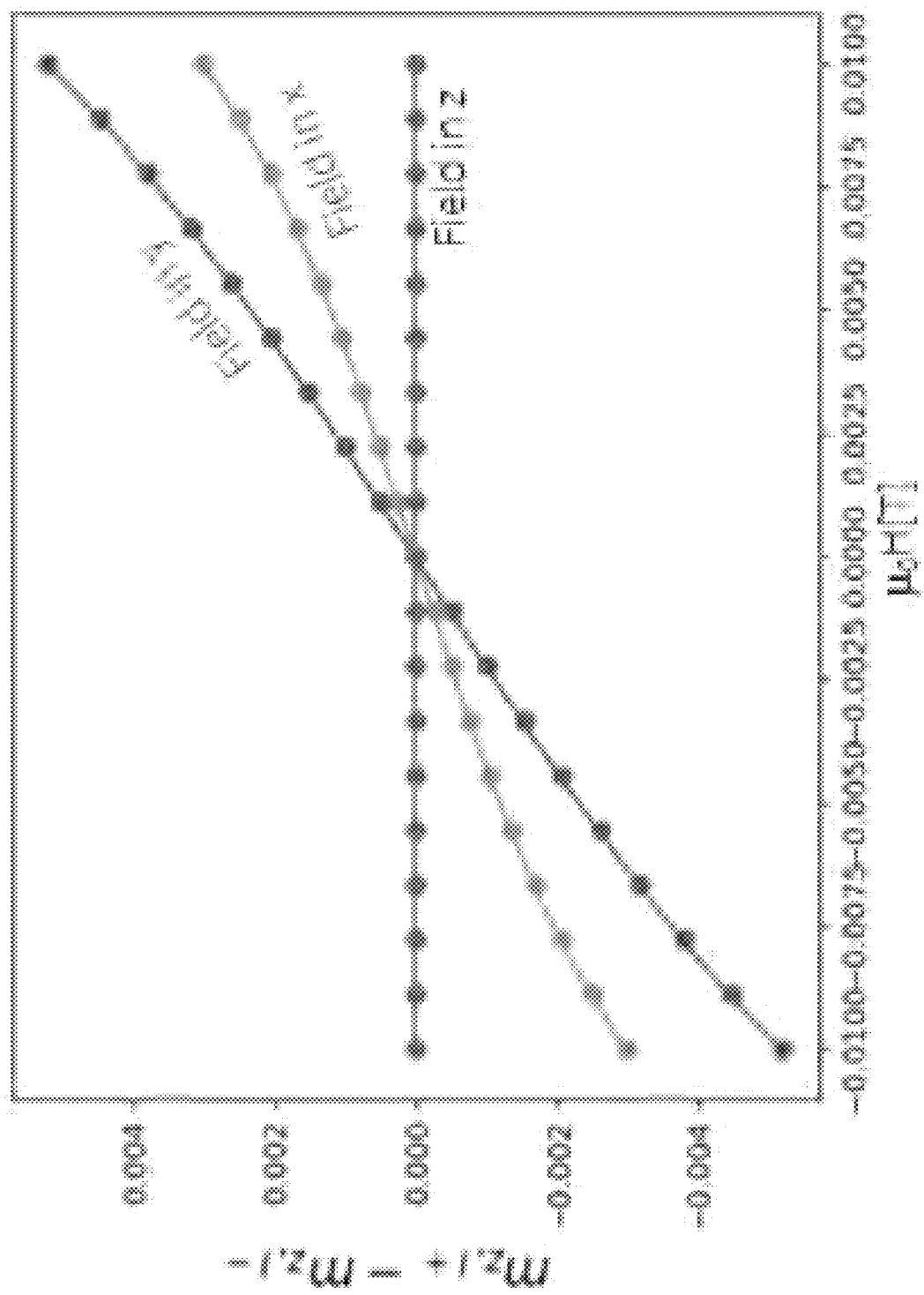
FIG. 11 illustrates an example sensor response for the sensor configuration as shown in FIG. 10 with respect to external magnetic fields in the x, y, and z-directions for low SOT currents, in accordance with one or more embodiments of the disclosure.

Again, for small SOT currents less than the critical SOT current strength, the magnetization direction in the ferromagnetic layer 106 is only modulated by the SOT current. The direction of sensitivity of the sensor 1000 with respect to external magnetic fields is the same as the direction of magnetization modulated due to the SOT current. Hence, the sensor 1000 is also sensitive to in-plane fields as shown in FIG. 11, which illustrates a sensor response curve that indicates sensitivity of the sensor 1000. As shown in FIG. 11, the effective anisotropy field in the z-direction is 20 mT, and Js=1.5 T. The applied SOT current for the sensor response curve as shown in FIG. 11 is $j=10^9$ A/m², which corresponds to a low SOT current scenario (i.e. the SOT current is less than the predetermined threshold SOT current value).

Figure 12:
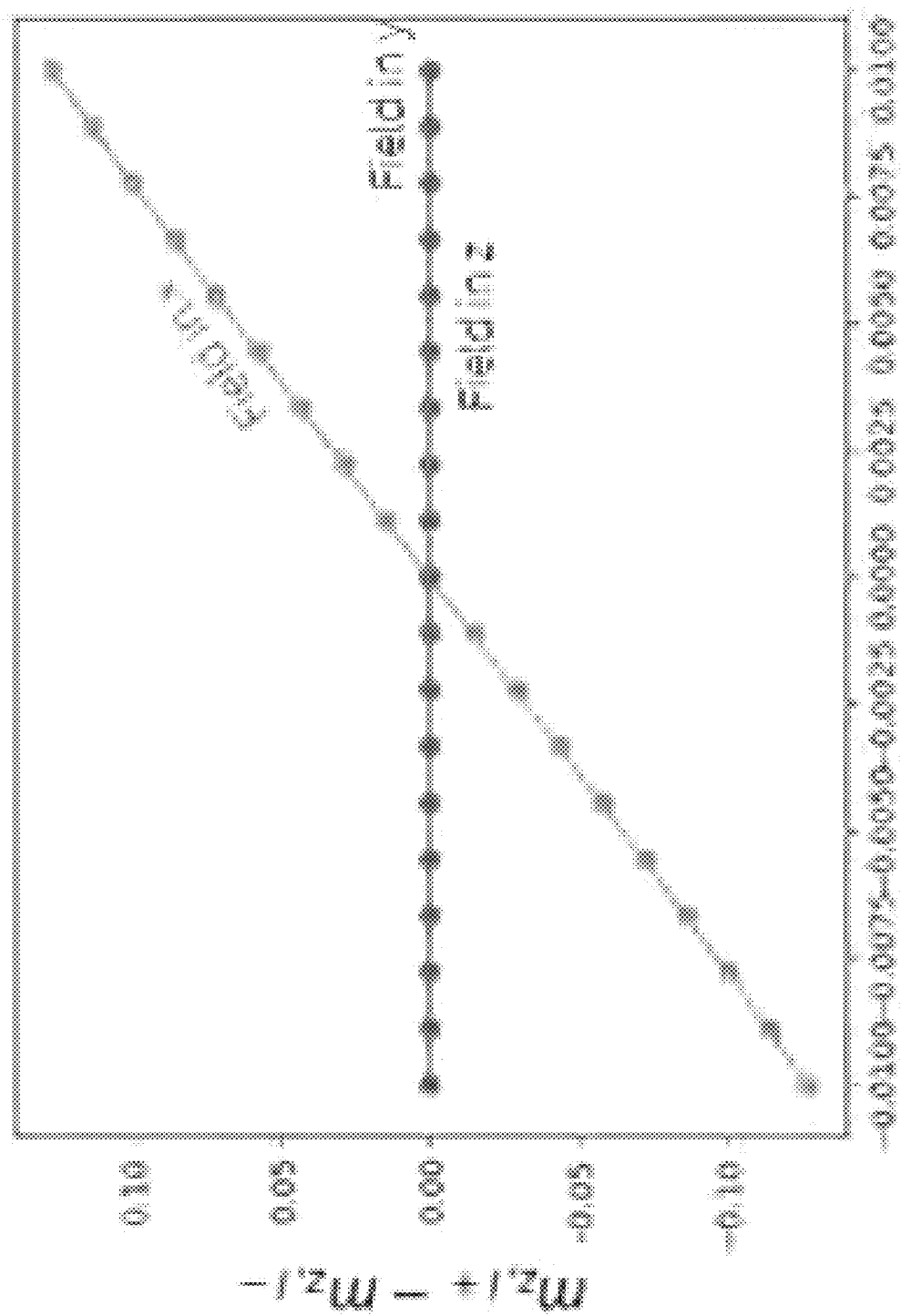
FIG. 12 illustrates an example sensor response for the sensor configuration as shown in FIG. 10 with respect to external magnetic fields in the x, y, and z-directions for high SOT currents, in accordance with one or more embodiments of the disclosure.

However, when the SOT current is increased to greater than the predetermined threshold SOT current value, a similar effect as discussed before occurs, and the direction of magnetization of the ferromagnetic layer 106 is switched in the ±My direction (e.g. +My for current polarity 1 and −My for the opposing current polarity). For instance, the applied SOT current for the sensor response curve as shown in FIG. 12 is $j=5\times10^{11}$ A/m², which corresponds to the high current scenario. As a result, the sensitivity direction of the sensor 1000 changes as shown in FIG. 12, which illustrates a sensor response curve that indicates sensitivity of the sensor 1000 for a high-current SOT scenario (i.e. the SOT current is greater than the predetermined threshold SOT current value). The sensor response curve as shown in FIG. 12 corresponds to an effective anisotropy field in the z-direction of 20 mT and Js=1.5 T.

Each of the embodiments as described herein advantageously ensures that the sensor is insensitive to orthogonal stray fields, i.e. insensitive to stray magnetic fields that are orthogonal to the particular direction of sensitivity for which the sensor is currently configured to detect external magnetic fields. For instance, and with reference to the sensor configuration 1000 as shown in FIG. 10, the sensor configuration 1000 is only sensitive to external magnetic fields in the x-direction (i.e. in-plane with the ferromagnetic layer 106) and not to stray fields applied in the z-direction (i.e. in the plane orthogonal to the ferromagnetic layer 106) or the y-direction. This is demonstrated in FIG. 12 as the sensor response curve does not indicate sensitivity to external magnetic fields other than in the x-direction. In other words, the sensor response curve shown in FIG. 12 demonstrates that the sensor configuration 1000 when operating in the high current regime is insensitive to external magnetic fields orthogonal to the direction of sensitivity (the x-direction in this example, with the sensor configuration 1000 being insensitive to external magnetic fields in the y- and z-directions).

Figure 13A:
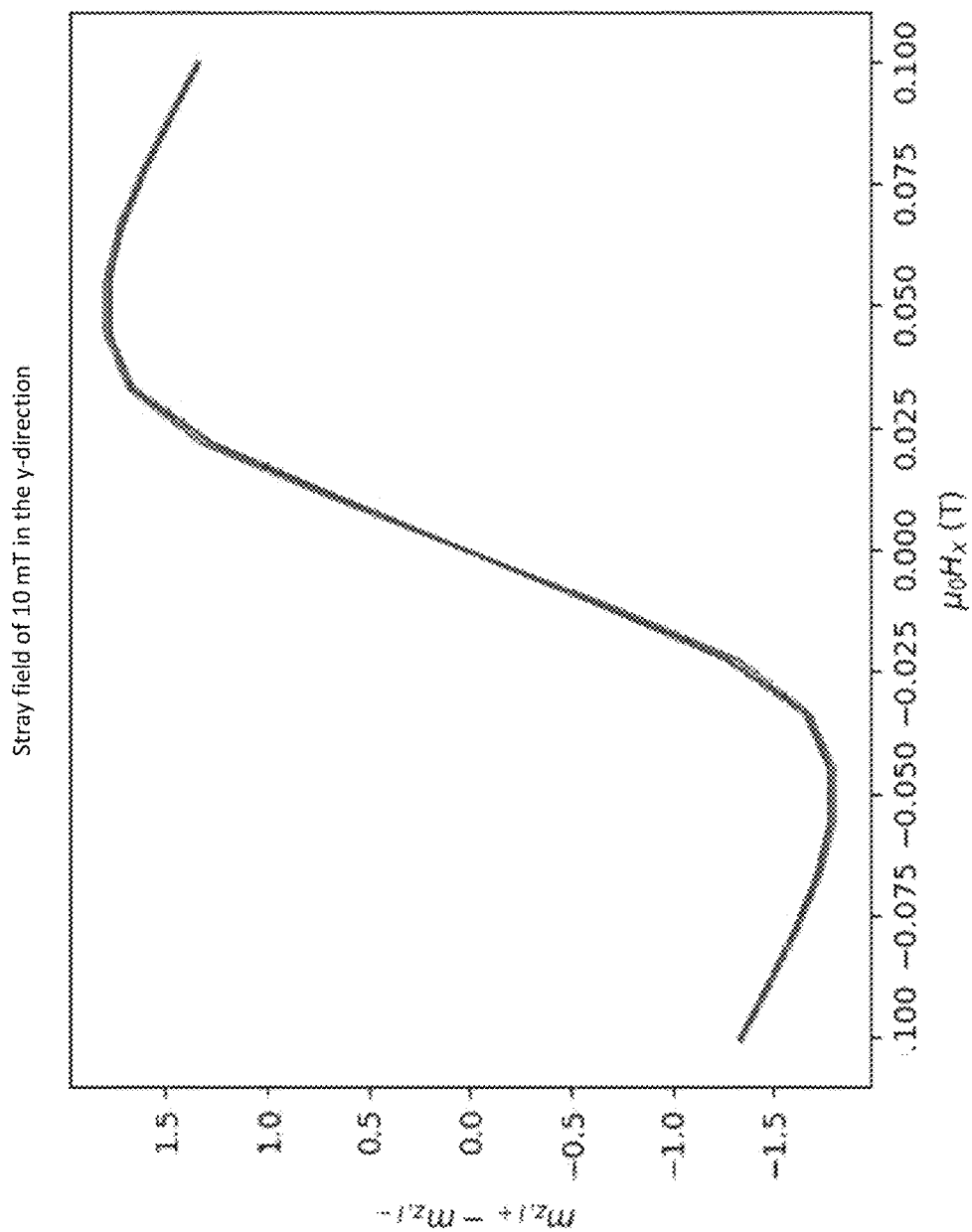
FIG. 13A illustrates an example sensor response for the sensor configuration as shown in FIG. 10 showing insensitivity to stray fields in the y-direction, in accordance with one or more embodiments of the disclosure.
Figure 13B:
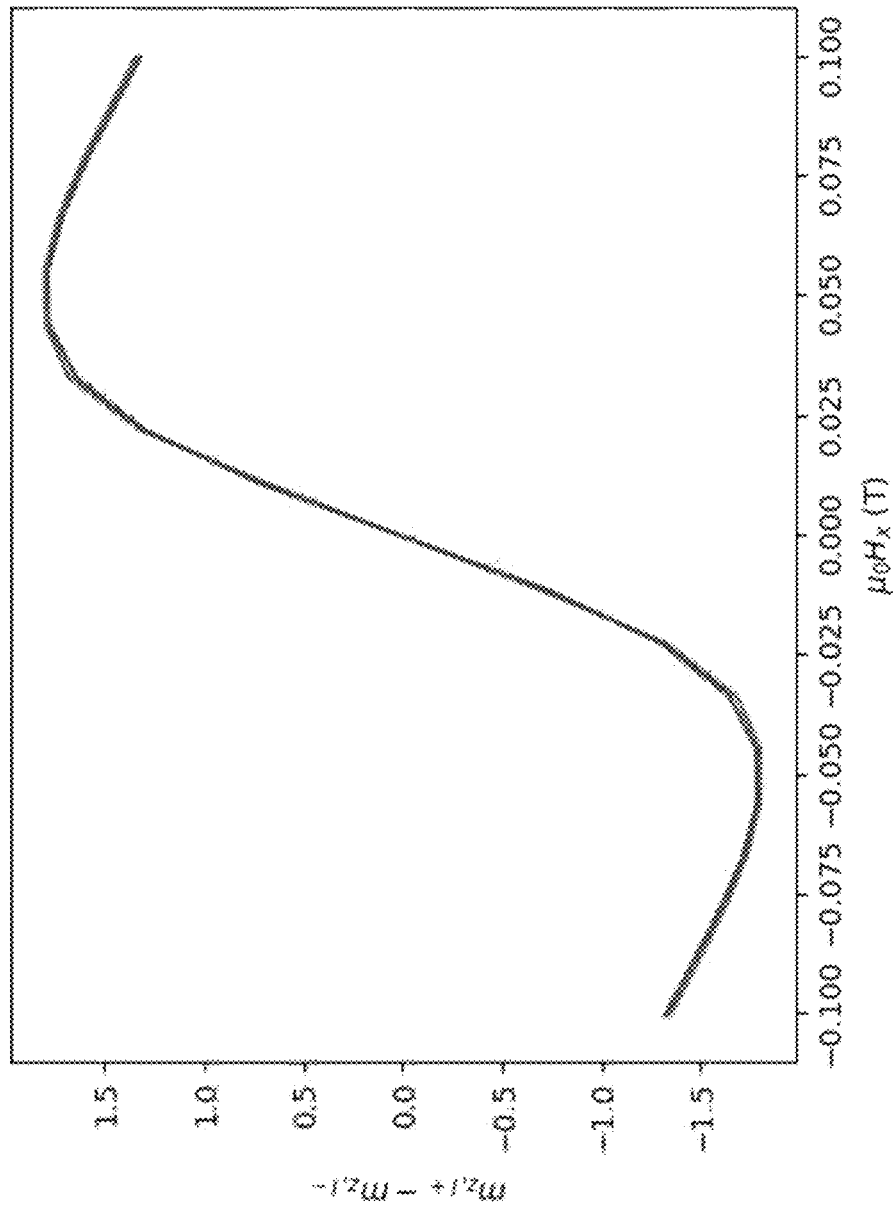
FIG. 13B illustrates an example sensor response for the sensor configuration as shown in FIG. 10 showing insensitivity to stray fields in the z-direction, in accordance with one or more embodiments of the disclosure.

This phenomenon is further illustrated in FIGS. 13A and 13B, which show the sensor response curve of the sensor 1000 as shown in FIG. 10 on a larger scale. For the sensor response curve as shown in FIG. 13A, a stray field is applied in the x-direction having a strength of 10 mT. The sensor response curve as shown in FIG. 13B corresponds to the application of a stray field of 10 mT in the z-direction. It can be observed that in each case, the sensor response curve remains the same and is not influenced by stray fields that are orthogonal to the direction of sensitivity, i.e. the x-direction in this example. Thus, the sensor configuration 1000 is only sensitive to external magnetic fields in the x-direction. This insensitivity to magnetic fields in directions orthogonal to the direction of magnetic field sensitivity in the large current scenario is provided by way of example with reference to the x-direction of sensitivity. This may be the case for any suitable direction of sensitivity as discussed herein. For instance, the sensor configuration 200 may likewise be configured to measure external magnetic fields in the z-direction (i.e. out-of-plane with respect to the ferromagnetic layer 106) and be insensitive to external magnetic fields in the x- and y-directions (i.e. in-plane with the ferromagnetic layer 106).

The embodiments described above utilize SOT currents to switch the sensitivity of the sensor 100 to external magnetic fields that are in-plane (i.e. in the same plane as the ferromagnetic layer 106) to external magnetic fields that are out-of-plane. The SOT currents may be applied in the above examples using the low current regime by applying SOT currents at a lower current amplitude, i.e. less than the predetermined threshold current value, to perform the in-plane magnetic field measurements. However, embodiments include alternatively sensing the in-plane or out-of-plane external magnetic field components using standard xMR, GMR, or TMR techniques, i.e. without the application of an SOT current.

Figure 14:
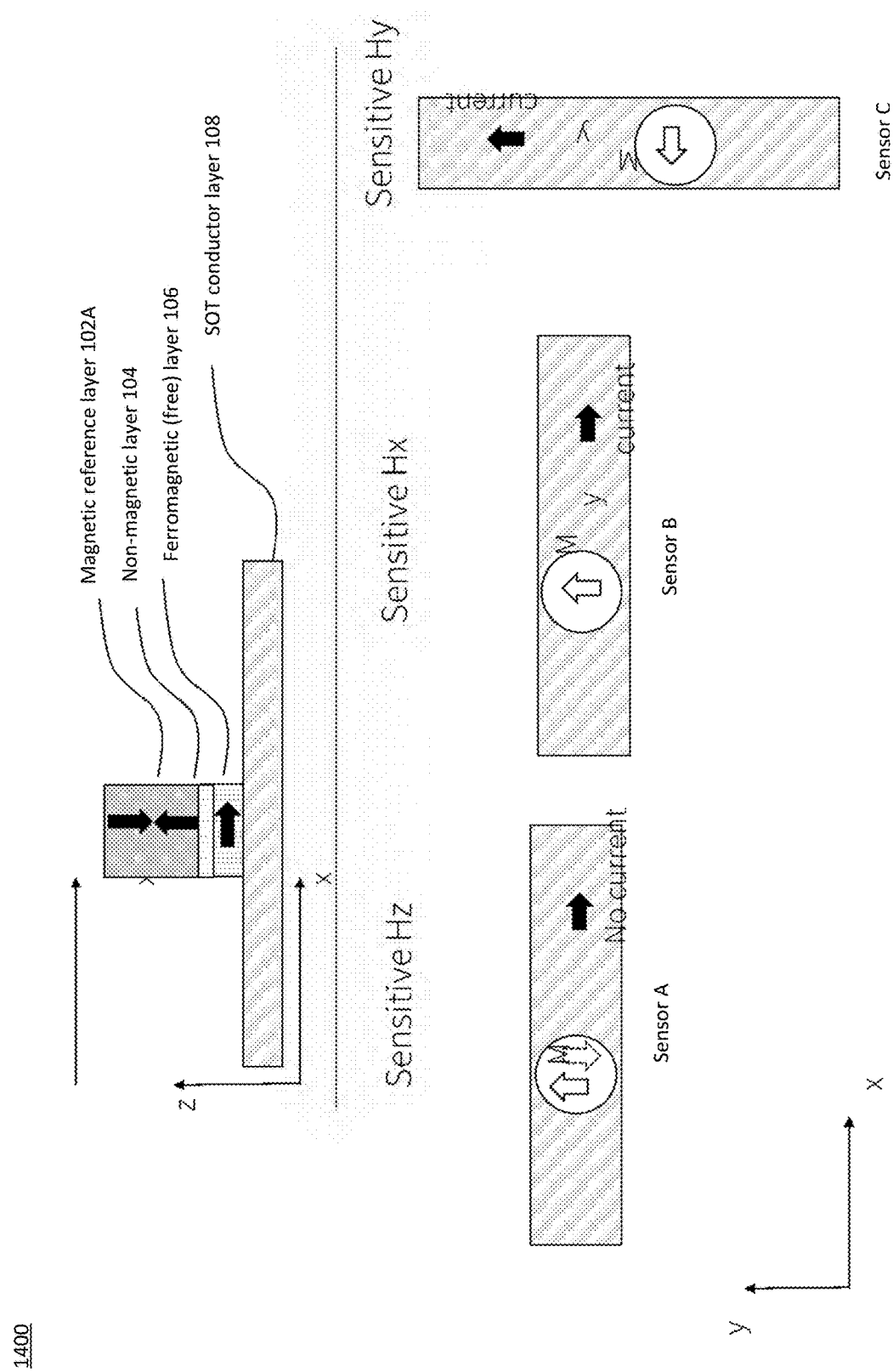
FIG. 14 illustrates an example sensor configuration with an out-of-plane reference system and an in-plane ferromagnetic layer, which are sensitive to external magnetic fields in the x-, y-, and z-directions, in accordance with one or more embodiments of the disclosure.

The sensor configuration 1000 as shown in FIG. 10 may be further modified to implement such standard xMR senor techniques or other suitable sensing techniques without the use of an applied SOT current to detect out-of-plane external magnetic fields using an out-of-plane reference system, thus enabling the detection of 3D external magnetic fields. An example of such a configuration is shown in FIG. 14, which uses the same layer stack as discussed herein for the sensor configuration 1000 but implements the ferromagnetic layer 106 having an in-plane magnetization direction at a default state. Thus, to sense the external magnetic field in the z-direction, the sensor configuration 1400 is operated as sensor A without the application of the SOT current. Hence, the z-component of external magnetic fields are detected in this manner similar to a standard xMR sensor. However, to detect the in-plane external magnetic field components in the x- and the y-directions, the application of SOT current may be implemented to rotate the magnetization direction of the ferromagnetic layer 106 in the ±My direction. As a result, when operated in this manner, the sensor configuration as shown in FIG. 14 becomes sensitive to external magnetic field components in the x-direction when SOT currents are applied that exceed the predetermined threshold current value, as shown in sensor B.

Another sensor C may be implemented with the sensor A or the sensor B as part of an integrated sensor package. The sensor C may be identical to the sensor A or the sensor B but oriented 90 degrees with respect to one another. In this orientation, the sensor C is sensitive to external magnetic field components in the y-direction when SOT currents are applied that exceed the predetermined threshold current value. In such a configuration, the linear range of the operation of the out-of-plane and in-plane magnetic field measurements may be tuned such that the output of each matches one another. This may be implemented by recognizing that the linear regime for the sensor A with respect to the detection of external magnetic fields in the z-direction increases with larger in-plane anisotropy, whereas the linear regime with respect to the detection of external magnetic fields in the in-plane sensitive layers (the x- and y-directions) may be additionally tuned with the strength of the SOT current.

The sensor configuration 100 as shown in FIG. 1 may be further modified to implement standard GMR or TMR techniques, or other suitable sensing techniques without the use of an applied SOT current. In accordance with such embodiments, no SOT currents are applied to detect in-plane external magnetic field components, with the measured signal being sensitive to external magnetic fields in the magnetization component of the ferromagnetic layer 106 that is parallel to the magnetic reference layer 102, as shown in FIG. 15.

Figure 15:
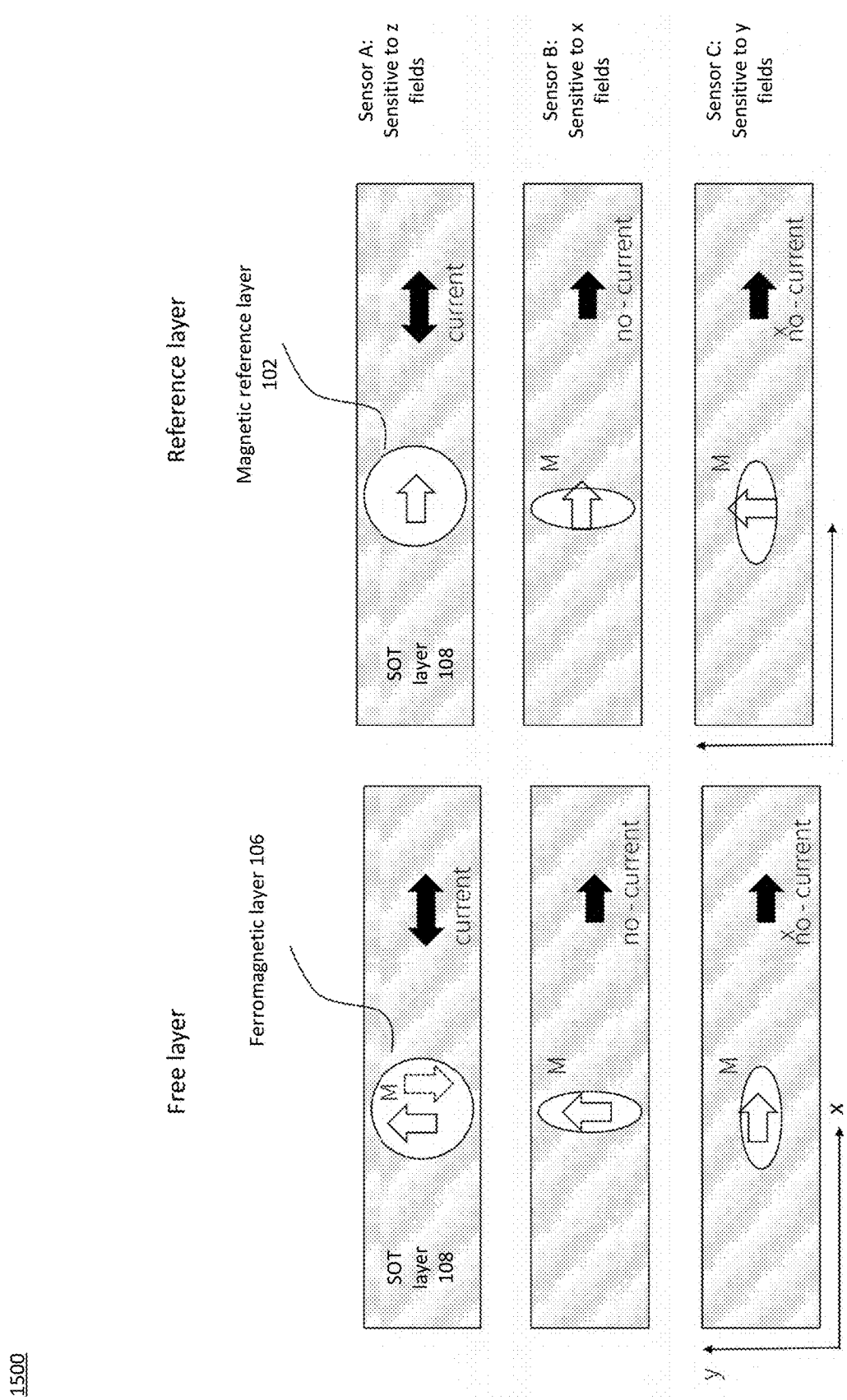
FIG. 15 illustrates additional example sensor configurations that are sensitive to external magnetic fields in the x-, y-, and z-directions, in accordance with one or more embodiments of the disclosure.

In each of the sensor configurations A, B, and C as shown in FIG. 15, the reference system is an in-plane system. The reference system in the sensor configuration 1500 of FIG. 15A is aligned in the y-direction, as is the magnetization direction of the ferromagnetic layer 106A in the default state. The reference system for the sensor configuration of sensor C as shown in FIG. 15 and the magnetization direction of the ferromagnetic layer 106A is the x direction in the default state (i.e. without an external magnetic field being applied). The sensor C will thus sensor will be sensitive to y-fields when standard GMR or TMR techniques are implemented in the absence of an SOT current to perform external magnetic field measurements. An equivalent sensor which is sensitive to magnetic field in the x-direction is shown in FIG. 15 as sensor B.

With respect to the configuration with respect to the sensor A as shown in FIG. 15, the SOT current may be applied in the SOT conductor layer 108 in excess of the predetermined threshold value in accordance with the embodiments described above to rotate the magnetization direction of an elliptically-shaped ferromagnetic layer 106 in the ±My direction, which results in the sensor being sensitive to external magnetic fields in the z-direction.

Through the use of the standard GMR or TMR techniques, the measured resistance (i.e. the inverse of the measured conductance) of the magnetoresistive element of sensor B that is sensitive to the external magnetic field components in the x-direction changes almost linearly with the external magnetic field in the x-direction (Bx). Thus, this may be used as the sensor output to measure the external magnetic fields in the x-direction.

Alternatively the following sequence may be used for the sensors that are sensitive to in-plane external magnetic fields:

1. An SOT current pulse is applied in the x direction to switch the magnetization direction of the elliptical ferromagnetic layer 106 to the ±My direction.

2. The control circuitry 110 measures the resistance R1 of the magnetoresistive element of each of sensors.

3. The control circuitry applies a second SOT current pulse in the SOT conductor layer 108 with an opposite current direction.

4. The control circuitry 110 measures the resistance R2 of the magnetoresistive element of sensors A/B.

5. For each respective sensor, the control circuitry 110 averages the two resistance values Reff=½*(R1+R2) to obtain the output Reff that is proportional to the sensor signal.

Figure 16:
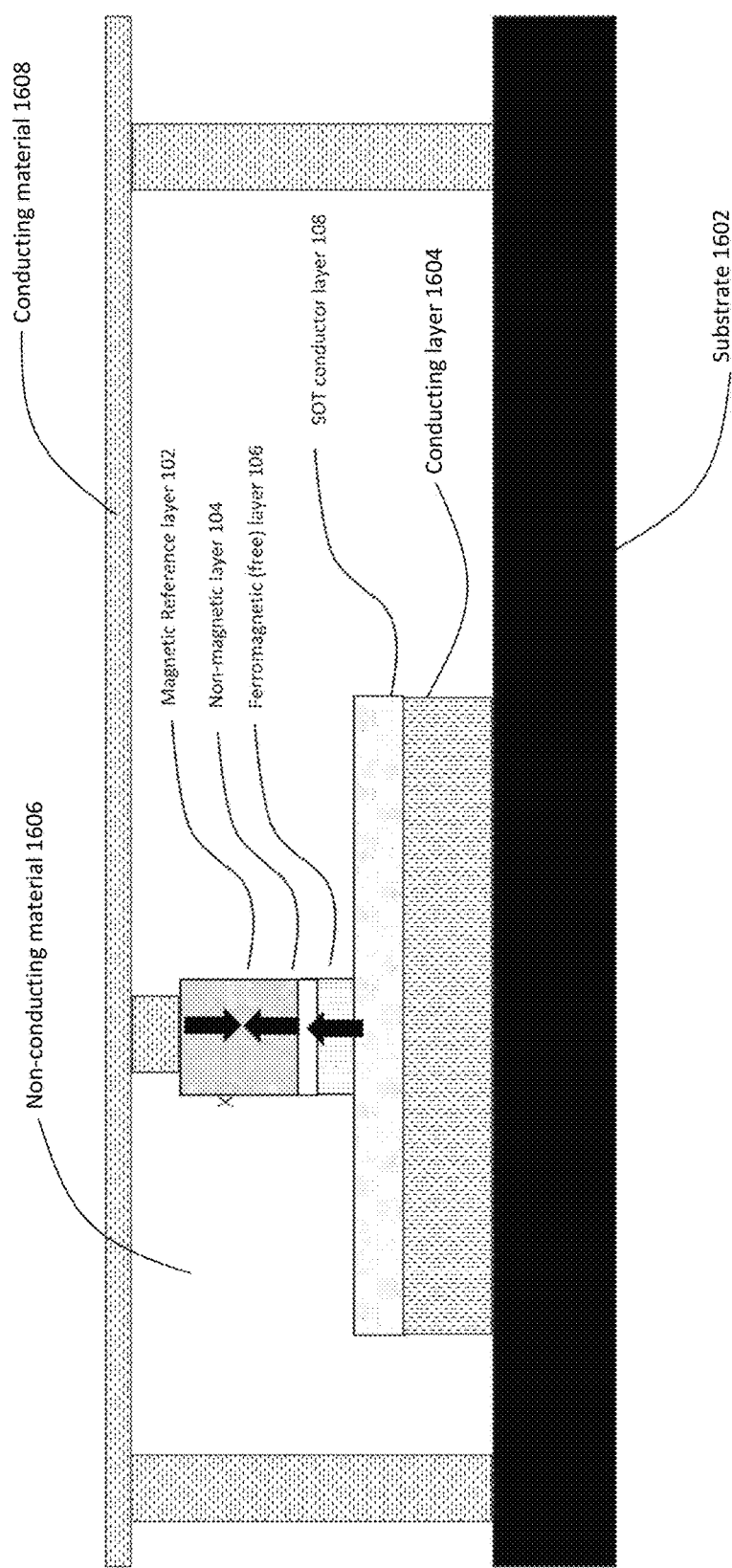
FIG. 16 illustrates an example sensor configuration that is optimized to reduce sensor heating of the sensor, in accordance with one or more embodiments of the disclosure.

FIG. 16 illustrates an example sensor configuration that is optimized to reduce the heating of the sensor 100. As shown in FIG. 16, in an embodiment, the sensor 100 (and any of the other sensors as discussed herein) may be integrated as part of a sensor package that is mounted to a substrate 1602, which may be a PCB for instance. The sensor 100 may thus alternatively include any of the additional components as discussed herein with reference to the FIG. 16. The sensor configuration 1600 also includes a conducting material 1608 that functions as a shield and/or housing over the layers of the sensor 100 as discussed herein, and which may be bonded to the magnetic reference layer 102 (directly or indirectly). The sensor configuration 1600 further includes a non-conducting material 1606, such as potting compound or conformal coating, for instance, or other suitable type of non-conductive material. The non-conducting material 1606 may function to house and/or encapsulate the layers of the sensor 100 within the conducting material 1608.

The sensor configuration 1600 may include one or more conducting layers 1604 comprised of any suitable type of material that functions to guide heat from the SOT conductor layer 108. The one or more conducting layers 1604 may bond the SOT conductor layer 108 to the substrate 1602. The sensor configuration 1600 may thus reduce the heating of the sensor 100 via use of one or more conducting layers 1604, which again may be bonded to the magnetic reference layer 102. The one or more conducting layers 1604 may include one or more thermally-conductive but electrically non-conductive layers that may directly or indirectly contact the substrate 1602 and the SOT conductor layer 108. In some embodiments, the one or more conducting layers 1604 may directly contact the SOT conductor layer 108, and the one or more conducting layers 1604 may be deposited onto the SOT conductor layer 108. The one or more conducting layers 1604 may have a high thermal conductivity, and thus function as a heat sink to protect the layers of the sensor 100. In other embodiments, one or more of the conducting layers 1604 may be separated from the SOT conductor layer 108 (e.g. electrically separated) by a non-conducting material (e.g. SiO), which may form part of the one or more conducting layers 1604. In either case, the sensor configuration 1600 may facilitate guiding heat that is generated in the SOT layer 108 via the use of the SOT current application, which may otherwise heat the other layers of the sensor 100, to the substrate 1602. As a consequence, the heating of sensor 100 may be significantly reduced. This may be particularly useful so as not do destroy the xMR (e.g. TMR, GMR, etc.) magnetic elements and/or alter the magnetic materials in the sensor 100 (e.g. silicon-based maters, electrically non-conductive or electrically-conductive materials, thermally-conductive materials, etc.).

EXAMPLES

The techniques of this disclosure may also be described in the following examples.

Example 1. A sensor, comprising: a layer stack comprising: a ferromagnetic layer having a variable magnetization direction which is modified by the spin orbit torque (SOT) effect and external magnetic fields; a magnetic reference layer having a fixed magnetization direction; and a non-magnetic layer arranged between the ferromagnetic layer and the magnetic reference layer to form a magnetoresistive element; a SOT conductor layer coupled to the layer stack adjacent to the ferromagnetic layer; and control circuitry configured to apply an SOT current to the SOT conductor layer in one of a first current direction or a second current direction that is antiparallel to the first current direction, and to detect a magnetic field acting externally to the sensor by determining a conductance of the magnetoresistive element that is dependent on the SOT current, wherein when the SOT current is applied in the first current direction exceeding a predetermined threshold current value, the variable magnetization direction is tilted to align with a first magnetization direction, wherein when the SOT current is applied in the second current direction exceeding the predetermined threshold current value, the variable magnetization direction is tilted to align with a second magnetization direction, and wherein the sensor is sensitive to magnetic fields acting externally to the sensor that are perpendicular to the fixed magnetization direction.

Example 2. The sensor of Example 1, wherein the ferromagnetic layer forms a film plane, and wherein the variable magnetization direction in the ferromagnetic layer in the absence of (i) the applied SOT current, and (ii) the magnetic field acting externally to the sensor, is in a magnetization direction that is parallel to the film plane.

Example 3. The sensor of any combination of Examples 1-2, wherein the ferromagnetic layer forms a film plane, and wherein the variable magnetization direction in the ferromagnetic layer in the absence of (i) the applied SOT current, and (ii) the magnetic field acting externally to the sensor is in a magnetization direction that is perpendicular to the film plane.

Example 4. The sensor of any combination of Examples 1-3, wherein the first current direction and the second current direction are perpendicular to the first magnetization direction and the second magnetization direction in the ferromagnetic layer.

Example 5. The sensor of any combination of Examples 1-4, wherein the first current direction and the second current direction are parallel to the first magnetization direction and the second magnetization direction in the ferromagnetic layer.

Example 6. The sensor of any combination of Examples 1-5, wherein: the control circuitry is configured to adjust an amplitude of the applied SOT current in the first direction and the second direction from a first current amplitude to a larger, second current amplitude that exceeds the predetermined threshold current value, the applied SOT current having the first current amplitude causes the sensor to be sensitive to magnetic fields acting externally to the sensor that are in a first plane, and the applied SOT current having the larger, second current amplitude causes the sensor to be sensitive to magnetic fields acting externally to the sensor that are in a second plane that is perpendicular to the first plane.

Example 7. The sensor of any combination of Examples 1-6, wherein: the control circuitry is configured to adjust an amplitude of the applied SOT current in the first direction and the second direction from a first current amplitude to a larger, second current amplitude that exceeds the predetermined threshold current value, the applied SOT current having the first current amplitude causes the sensor to be sensitive to magnetic fields acting externally to the sensor that are in-plane with the ferromagnetic layer, and the applied SOT current having the larger, second current amplitude causes the sensor to have a magnetic sensitivity to magnetic fields orthogonal to the ferromagnetic layer.

Example 8. The sensor of any combination of Examples 1-7, wherein the sensor has a linear range of magnetic field detection that is a function of an amplitude of the applied SOT current.

Example 9. The sensor of any combination of Examples 1-8, wherein the applied SOT current having the larger, second current amplitude causes the sensor to be sensitive to magnetic fields acting externally to the sensor only in the second plane and not to magnetic fields in the first plane.

Example 10. The sensor of any combination of Examples 1-9, further comprising: a conducting layer that is coupled to the SOT conductor layer and to a substrate.

Example 11. The sensor of any combination of Examples 1-10, wherein the conducting layer is in direct contact with the SOT conductor layer.

Example 12. The sensor of any combination of Examples 1-11, wherein the conducting layer is electrically separated from the SOT conductor layer.

Example 13. A sensor, comprising: a layer stack comprising: a ferromagnetic layer having a variable magnetization direction which is modified by the spin orbit torque (SOT) effect and external magnetic fields; a magnetic reference layer having a fixed magnetization direction; and a non-magnetic layer arranged between the ferromagnetic layer and the magnetic reference layer to form a magnetoresistive element; a SOT conductor layer coupled to the layer stack adjacent to the ferromagnetic layer; and control circuitry configured to apply an SOT current to the SOT conductor layer in one of a first current direction or a second current direction that is antiparallel to the first current direction, and to detect a magnetic field acting externally to the sensor by determining a conductance of the magnetoresistive element that is dependent on the SOT current, wherein the sensor is sensitive to magnetic fields acting externally to the sensor that are perpendicular to the fixed magnetization direction of the magnetic reference layer.

Example 14. The sensor of Example 13, wherein the ferromagnetic layer forms a film plane, and wherein the variable magnetization direction in the ferromagnetic layer in the absence of (i) an applied SOT current, and (ii) a magnetic field acting externally to the sensor, is in a magnetization direction that is parallel to the film plane.

Example 15. The sensor of any combination of Examples 13-14, wherein when the SOT current is applied in the first current direction exceeding a predetermined threshold current value, the variable magnetization direction is tilted to align with a first magnetization direction, and wherein when the SOT current is applied in the second current direction exceeding the predetermined threshold current value, the variable magnetization direction is tilted to align with a second magnetization direction.

Example 16. The sensor of any combination of Examples 13-15, wherein when the SOT current is applied in the first current direction the variable magnetization direction is in a first magnetization direction, and wherein when the SOT current is applied in the second current direction the variable magnetization direction is in a second magnetization direction.

Example 17. The sensor of any combination of Examples 13-16, wherein the first current direction and the second current direction are perpendicular to the first magnetization direction and the second magnetization direction in the film plane.

Example 18. The sensor of any combination of Examples 13-17, wherein when the first current direction and the second current direction are parallel to the first magnetization direction and to the second magnetization direction in the film plane.

Example 19. The sensor of any combination of Examples 13-18, wherein the sensor has a linear range of sensitivity to magnetic fields acting externally to the sensor that is a function of an amplitude of the applied SOT current.

Example 20. The sensor of any combination of Examples 13-19, wherein the ferromagnetic layer forms a film plane, and wherein the sensor is not sensitive to magnetic fields acting externally to the sensor that are parallel to the film plane.

Example 21. A sensor, compromising a layer stack comprising: a ferromagnetic layer having a variable magnetization direction which is modified by the spin orbit torque (SOT) effect and external magnetic fields; a magnetic reference layer having a fixed magnetization direction; and a non-magnetic layer arranged between the ferromagnetic layer and the magnetic reference layer to form a magnetoresistive element; a SOT conductor layer coupled to the layer stack and adjacent to the ferromagnetic layer; and control circuitry configured to apply an SOT current to the SOT conductor layer in one of a first current direction or a second current direction that is antiparallel to the first current direction, and to detect a magnetic field acting externally to the sensor by determining a conductance of the magnetoresistive element that is dependent on the SOT current, wherein in an absence of the magnetic field acting externally to the sensor, the applied SOT current causes the variable magnetization direction of the ferromagnetic layer to be antiparallel to the first current direction when the SOT current is applied the first current direction, and to be antiparallel to the second current direction when the SOT current is applied the second current direction.

Example 22. The sensor of Example 21, wherein in an absence of applied SOT current, the variable magnetization direction in the ferromagnetic layer is perpendicular to the first current direction and to the second current direction.

Example 23. The sensor of any combination of Examples 21-22, wherein when the SOT current is applied in the first current direction exceeding a predetermined threshold current value, the variable magnetization direction is tilted to align with a first magnetization direction, and wherein when the SOT current is applied in the second current direction exceeding the predetermined threshold current value, the variable magnetization direction is tilted to align with a second magnetization direction.

Example 24. The sensor of any combination of Examples 21-23, wherein the sensor has a linear range of sensitivity to magnetic fields acting externally to the sensor that is a function of an amplitude of the applied SOT current.

Example 25. The sensor of any combination of Examples 21-24, wherein the ferromagnetic layer forms a film plane, and wherein when the applied SOT current is greater than a predetermined SOT current threshold value, the sensor is not sensitive to magnetic fields acting externally to the sensor that are parallel to the film plane.

Example 26. A sensor, comprising: a layer stack comprising a ferromagnetic layer having a variable magnetization direction which is modified by the spin orbit torque (SOT) effect and external magnetic fields; a SOT conductor layer coupled to the layer stack adjacent to the ferromagnetic layer; and control circuitry configured to apply an SOT current to the SOT conductor layer in one of a first current direction or a second current direction that is antiparallel to the first current direction, and to detect a magnetic field acting externally to the sensor by determining a conductance or voltage of a structure in the layer stack that is dependent on the SOT current, wherein when the SOT current is applied in the first current direction exceeding a predetermined threshold current value, the variable magnetization direction is tilted to align with a first magnetization direction, wherein when the SOT current is applied in the second current direction exceeding the predetermined threshold current value, the variable magnetization direction is tilted to align with a second magnetization direction.

Example 27. The sensor of Example 26, wherein: the sensor is formed as a Hall cross, and the SOT current is applied along one arm of the Hall cross, and the voltage is measured along a second arm of the Hall cross.

Example 28. The sensor of any combination of Examples 26-27, wherein the layer stack further comprises (i) a magnetic reference layer having a fixed magnetization direction, and (ii) a non-magnetic layer arranged between the ferromagnetic layer and the magnetic reference layer to form a magnetoresistive element, and wherein the structure in the layer stack that is dependent on the SOT comprises the magnetoresistive element

CONCLUSION

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

It is further to be noted that specific terms used in the description and claims may be interpreted in a very broad sense. For example, the terms "circuit" or "circuitry" used herein are to be interpreted in a sense not only including hardware but also software, firmware or any combinations thereof. The term "data" may be interpreted to include any form of representation data. The term "information" may in addition to any form of digital information also include other forms of representing information. The term "entity" or "unit" may in embodiments include any device, apparatus circuits, hardware, software, firmware, chips, or other semiconductors as well as logical units or physical implementations of protocol layers etc. Furthermore the terms "coupled" or "connected" may be interpreted in a broad sense not only covering direct but also indirect coupling.

It is further to be noted that methods disclosed in the specification or in the claims may be implemented by a device having means for performing each of the respective steps of these methods.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This disclosure is intended to cover any adaptations or variations of the specific embodiments discussed herein.

What is claimed is:

1. A sensor, comprising:
   a layer stack comprising:
      a ferromagnetic layer having a variable magnetization direction which is modified by the spin orbit torque (SOT) effect and magnetic fields acting externally to the sensor;
      a magnetic reference layer having a fixed magnetization direction; and
      a non-magnetic layer arranged between the ferromagnetic layer and the magnetic reference layer to form a magnetoresistive element;
   a SOT conductor layer coupled to the layer stack adjacent to the ferromagnetic layer; and
   control circuitry configured to apply an SOT current to the SOT conductor layer in a first current direction, to apply an SOT current to the SOT conductor layer in a second current direction subsequent to applying the SOT current in the first current direction, the second current direction being antiparallel to the first current direction, and to generate sensor signals indicative of an amplitude of the magnetic fields acting externally to the sensor by (i) sequentially measuring a respective conductance of the magnetoresistive element that is dependent on the SOT current applied in the first current direction and the second current direction, (ii) determining a difference between the respective conductance measurements, and (iii) generating the sensor signals, representative of the difference between the respective conductance measurements,
   wherein the control circuitry is configured to adjust an amplitude of the SOT current in the first current direction to have a first current value that is less than a threshold current value during a first time period, and to adjust an amplitude of the SOT current in the second current direction to have a second current value that exceeds the predetermined threshold current value during a second time period,
   wherein the SOT current applied in the first current direction exceeding the predetermined threshold current value causes the variable magnetization direction of the ferromagnetic layer to tilt and align with a first magnetization direction,
   wherein the SOT current applied in the second current direction exceeding the predetermined threshold current value causes the variable magnetization direction of the ferromagnetic layer to tilt and align with a second magnetization direction,
   wherein the sensor is sensitive to the magnetic fields acting externally to the sensor that are perpendicular to the fixed magnetization direction,
   wherein the ferromagnetic layer has a shape anisotropy that modulates the variable magnetization direction of the ferromagnetic layer as a function of the amplitude of the SOT current that is applied in the first current direction and the amplitude of the SOT current that is applied in the second current direction, and
   wherein the control circuitry is configured to generate the sensor signals indicative of the amplitude of the magnetic fields acting externally to the sensor that are in-plane with the ferromagnetic layer and out-of-plane with the ferromagnetic layer based upon the modulation of the variable magnetization direction of the ferromagnetic layer.

2. The sensor of claim 1, wherein the ferromagnetic layer forms a film plane, and
wherein the variable magnetization direction in the ferromagnetic layer in an absence of (i) the SOT current applied in the first current direction and the SOT current applied in the second current direction, and (ii) the magnetic fields acting externally to the sensor, is in a magnetization direction that is parallel to the film plane.

3. The sensor of claim 1, wherein the ferromagnetic layer forms a film plane, and
wherein the variable magnetization direction in the ferromagnetic layer in an absence of (i) the SOT current applied in the first current direction and the SOT current applied in the second current direction, and (ii) the magnetic fields acting externally to the sensor is in a magnetization direction that is perpendicular to the film plane.

4. The sensor of claim 1, wherein the first current direction and the second current direction are perpendicular to the first magnetization direction and the second magnetization direction in the ferromagnetic layer.

5. The sensor of claim 1, wherein the first current direction and the second current direction are parallel to the first magnetization direction and the second magnetization direction in the ferromagnetic layer.

6. The sensor of claim 1, wherein:
the respective current amplitude of the applied SOT current in the first current direction and the applied SOT current in the second current direction being less than the predetermined threshold current value causes the sensor to be sensitive to the magnetic fields acting externally to the sensor that are in a first plane, and
the respective current amplitude of the applied SOT current in the first current direction and the applied SOT current in the second current direction exceeding the predetermined threshold current value causes the sensor to be sensitive to ex the magnetic fields acting externally to the sensor that are in a second plane that is perpendicular to the first plane.

7. The sensor of claim 1, wherein:
the respective current amplitude of the applied SOT current in the first current direction and the applied SOT current in the second current direction being less than the predetermined threshold current value causes the sensor to be sensitive to the magnetic fields acting externally to the sensor that are in-plane with the ferromagnetic layer, and
the respective current amplitude of the applied SOT current in the first current direction and the applied SOT current in the second current direction exceeding the predetermined threshold current value causes the sensor to have a magnetic sensitivity to the magnetic fields acting externally to the sensor that are orthogonal to the ferromagnetic layer.

8. The sensor of claim 1, wherein the sensor has a linear range of magnetic field detection that is a function of the amplitude of the SOT current applied in the first current direction and the amplitude of the SOT current applied in the second current direction.

9. The sensor of claim 6, wherein the respective current amplitude of the SOT current applied in the first current direction and the SOT current applied in the second current direction exceeding the predetermined threshold current value causes the sensor to be sensitive to the magnetic fields acting externally to the sensor only in the second plane and not to the magnetic fields acting externally to the sensor that that are in the first plane.

10. The sensor of claim 1, further comprising:
a conducting layer that is coupled to the SOT conductor layer and to a substrate.

11. The sensor of claim 10, wherein the conducting layer is in direct contact with the SOT conductor layer.

12. The sensor of claim 11, wherein the conducting layer is electrically separated from the SOT conductor layer.

13. A sensor, comprising:
a layer stack comprising:
a ferromagnetic layer having a variable magnetization direction which is modified by the spin orbit torque (SOT) effect and magnetic fields acting externally to the sensor;
a magnetic reference layer having a fixed magnetization direction; and
a non-magnetic layer arranged between the ferromagnetic layer and the magnetic reference layer to form a magnetoresistive element;
a SOT conductor layer coupled to the layer stack adjacent to the ferromagnetic layer; and
control circuitry configured to apply an SOT current to the SOT conductor layer in a first current direction, to apply an SOT current to the SOT conductor layer in a second current direction subsequent to applying the SOT current in the first current direction, the second current direction being antiparallel to the first current direction, and to generate sensor signals indicative of an amplitude of the magnetic fields acting externally to the sensor by (i) sequentially measuring a respective conductance of the magnetoresistive element that is dependent on the SOT current applied in the first current direction and the SOT current applied in the second current direction, (ii) determining a difference between the respective conductance measurements, and (iii) generating the sensor signals representative of the difference between the respective conductance measurements,
wherein the sensor is sensitive to the magnetic fields acting externally to the sensor that are perpendicular to the fixed magnetization direction of the magnetic reference layer,
wherein the control circuitry is further configured to adjust an amplitude of the SOT current in the first current direction and to adjust an amplitude of the SOT corrent in the second current direction to have the SOT current in the second current direction to have a first current value that is less than a predetermined threshold current value during a first time period and a second current value that exceeds the predetermined threshold current value during a second time period,
wherein the ferromagnetic layer has a shape anisotropy that modulates the variable magnetization direction of the ferromagnetic layer as a function of the amplitude of the SOT current that is applied in the first current direction and the amplitude of the SOT current that is applied in the second current direction, and
wherein the control circuitry is configured to generate the sensor signals indicative of the amplitude of the magnetic fields acting externally to the sensor that are in-plane with the ferromagnetic layer and out-of-plane with the ferromagnetic layer based upon the modulation of the variable magnetization direction of the ferromagnetic layer.

14. The sensor of claim 13, wherein the ferromagnetic layer forms a film plane, and
wherein the variable magnetization direction in the ferromagnetic layer in an absence of (i) the SOT current applied in the first current direction and the SOT current applied in the second current direction, and (ii) the magnetic fields acting externally to the sensor, is in a magnetization direction that is parallel to the film plane.

15. The sensor of claim 13, wherein the SOT current applied in the first current direction exceeding the predetermined threshold current value causes the variable magnetization direction of the ferromagnetic layer to tilt and align with a first magnetization direction, and
the SOT current applied in the second current direction exceeding the predetermined threshold current value causes the variable magnetization direction of the ferromagnetic layer to tilt and align with a second magnetization direction.

16. The sensor of claim 13, wherein the SOT current being applied in the first current direction causes the variable magnetization direction to be in a first magnetization direction, and
wherein the SOT current being applied in the second current direction causes the variable magnetization direction to be in a second magnetization direction.

17. The sensor of claim 16, wherein the ferromagnetic layer forms a film plane, and
wherein the first current direction and the second current direction are perpendicular to the first magnetization direction and the second magnetization direction in the film plane.

18. The sensor of claim 16, wherein the ferromagnetic layer forms a film plane, and wherein the first current direction and the second current direction are parallel to the first magnetization direction and to the second magnetization direction in the film plane.

19. The sensor of claim 13, wherein the sensor has a linear range of sensitivity to the magnetic fields acting externally to the sensor that is a function of the amplitude of the SOT current applied in the first current direction and the amplitude of the SOT current applied in the second current direction.

20. The sensor of claim 13, wherein the ferromagnetic layer forms a film plane, and
wherein the sensor is not sensitive to the magnetic fields acting externally to the sensor that are parallel to the film plane.

21. A sensor, comprising:
a layer stack comprising:
    a ferromagnetic layer having a variable magnetization direction which is modified by the spin orbit torque (SOT) effect and magnetic fields acting externally to the sensor;
    a magnetic reference layer having a fixed magnetization direction; and
    a non-magnetic layer arranged between the ferromagnetic layer and the magnetic reference layer to form a magnetoresistive element;
a SOT conductor layer coupled to the layer stack and adjacent to the ferromagnetic layer; and
control circuitry configured to apply an SOT current to the SOT conductor layer in a first current direction, to apply an SOT current to the SOT conductor layer in a second current direction subsequent to applying the SOT current in the first current direction, the second current direction being antiparallel to the first current direction, and to generate sensor signals indicative of an amplitude of the magnetic fields acting externally to the sensor by (i) measuring a respective conductance of the magnetoresistive element that is dependent on the SOT current applied in the first current direction and the second current direction, (ii) determining a difference between the respective conductance measurements, and (iii) generating the sensor signals representative of the difference between the respective conductance measurements,
wherein the SOT current being applied in the first current direction while the magnetic fields are not acting externally to the sensor causes the variable magnetization direction of the ferromagnetic layer to be aligned with the first current direction, and the SOT current being applied in the second current direction while the magnetic fields are field-not acting externally to the sensor causes the variable magnetization direction of the ferromagnetic layer to be aligned with the second current direction,
wherein the control circuitry is further configured to adjust an amplitude of the SOT current in the first current direction to have a first current value that is less than a predetermined threshold current value during a first time period, and to adjust an amplitude of the SOT current in the second current direction to have a second current value that exceeds the predetermined threshold current value during a second time period,
wherein the ferromagnetic layer has a shape anisotropy that modulates the variable magnetization direction of the ferromagnetic layer as a function of the amplitude of the SOT current that is applied in the first current direction and the amplitude of the SOT current that is applied in the second current direction, and
wherein the control circuitry is configured to generate the sensor signals indicative of the amplitude of the magnetic fields acting externally to the sensor that are in-plane with the ferromagnetic layer and out-of-plane with the ferromagnetic layer based upon the modulation of the variable magnetization direction of the ferromagnetic layer.

22. The sensor of claim 21, wherein in an absence of the SOT current applied in the first current direction and the SOT current applied in the second current direction, the variable magnetization direction in the ferromagnetic layer is perpendicular to the first current direction and to the second current direction.

23. The sensor of claim 21, wherein the SOT current applied in the first current direction exceeding the predetermined threshold current value causes the variable magnetization direction of the ferromagnetic layer to tilt and align with a first magnetization direction, and
the SOT current applied in the second current direction exceeding the predetermined threshold current value causes the variable magnetization direction of the ferromagnetic layer to tilt and align with a second magnetization direction.

24. The sensor of claim 21, wherein the sensor has a linear range of sensitivity to the magnetic fields acting externally to the sensor that is a function of the amplitude of the SOT current applied in the first current direction and the amplitude of the SOT current applied in the second current direction.

25. The sensor of claim 21, wherein the ferromagnetic layer forms a film plane, and
wherein the applied SOT current applied in the first current direction and the SOT current applied in the second current direction being greater than a predetermined current threshold value causes the sensor to not be sensitive to the magnetic fields acting externally to the sensor that are parallel to the film plane.

26. A sensor, comprising:
a layer stack comprising a ferromagnetic layer having a variable magnetization direction which is modified by the spin orbit torque (SOT) effect and magnetic fields acting externally to the sensor;
a SOT conductor layer coupled to the layer stack adjacent to the ferromagnetic layer; and
control circuitry configured to apply an SOT current to the SOT conductor layer in a first current direction, to apply an SOT current to the SOT conductor layer in a second current direction subsequent to applying the SOT current in the first current direction, the second current direction being antiparallel to the first current direction, and to generate sensor signals indicative of an amplitude of the magnetic fields acting externally to the sensor by (i) measuring a respective conductance of a structure in the layer stack that is dependent on the SOT current that is applied in the first current direction and the SOT current that is applied in the second current direction, (ii) determining a difference between the respective conductance measurements, and (iii) generating the sensor signals representative of the difference between the respective conductance measurements,
wherein the control circuitry is further configured to adjust an amplitude of the SOT current in the first current direction to have a first current value that is less than a predetermined threshold current value during a first time period, and to adjust an amplitude of the SOT current in the second current direction to have a second current value that exceeds the predetermined threshold current value during a second time period,
wherein the SOT current being applied in the first current direction exceeding the predetermined threshold current value causes the variable magnetization direction of the ferromagnetic layer to tilt and align with a first magnetization direction,
wherein the SOT current being applied in the second current direction exceeding the predetermined threshold current value causes of the ferromagnetic layer the variable magnetization direction to tilt and align with a second magnetization direction, and
wherein the ferromagnetic layer has a shape anisotropy that modulates the variable magnetization direction of the ferromagnetic layer as a function of the amplitude of the SOT current that is applied in the first current direction and the amplitude of the SOT current that is applied in the second current direction, and
wherein the control circuitry is configured to generate the sensor signals indicative of the amplitude of the magnetic fields acting externally to the sensor that are in-plane with the ferromagnetic layer and out-of-plane with the ferromagnetic layer based upon the modulation of the variable magnetization direction of the ferromagnetic layer.

27. The sensor of claim 26, wherein:
the sensor is formed as a Hall cross, and
the SOT current is applied in the first current direction and the SOT current is applied in
the second current direction along one arm of the Hall cross.

28. The sensor of claim 26, wherein:
the layer stack further comprises a magnetoresistive element comprising (i) the ferromagnetic layer, (ii) a magnetic reference layer having a fixed magnetization direction, and (iii) a non-magnetic layer arranged between the ferromagnetic layer and the magnetic reference layer, and
the structure in the layer stack that is dependent on the SOT current that is applied in the first current direction and the SOT current that is applied in the second current direction comprises the magnetoresistive element.

* * * * *